United States Patent [19]

Spitz

[11] Patent Number: 5,939,697
[45] Date of Patent: Aug. 17, 1999

[54] BAR CODE EVALUATION SYSTEM ARCHITECTURES AND METHODS OF CALIBRATION

[75] Inventor: Glenn Steven Spitz, Northport, N.Y.

[73] Assignee: Webscan, Inc., Brentwood, N.Y.

[21] Appl. No.: 08/641,098

[22] Filed: Apr. 29, 1996

[51] Int. Cl.$^6$ .................................................. G06K 7/10
[52] U.S. Cl. ........................................ 235/462; 235/486
[58] Field of Search ................................. 235/438, 483, 235/484, 486, 462

[56] References Cited

U.S. PATENT DOCUMENTS

| | | | |
|---|---|---|---|
| 4,251,798 | 2/1981 | Swartz et al. | 235/462 |
| 4,360,798 | 11/1982 | Swartz et al. | 235/463 |
| 4,646,353 | 2/1987 | Tenge et al. | 235/437 |
| 4,679,154 | 7/1987 | Blanford | 235/462 |
| 4,860,226 | 8/1989 | Martin et al. | 235/437 |
| 4,894,790 | 1/1990 | Yotsuya et al. | 364/552 |
| 5,051,567 | 9/1991 | Tedesco | 235/462 |
| 5,080,456 | 1/1992 | Katz et al. | 359/214 |
| 5,194,720 | 3/1993 | Reinnagel et al. | 235/437 |
| 5,218,190 | 6/1993 | Hardesty et al. | 235/462 |
| 5,272,322 | 12/1993 | Nishida et al. | 235/462 |
| 5,317,166 | 5/1994 | Tafoya | 250/568 |
| 5,324,924 | 6/1994 | Cai et al. | 235/463 |
| 5,334,825 | 8/1994 | Maddox | 235/437 |
| 5,386,107 | 1/1995 | Dvorkis et al. | 235/462 |
| 5,608,200 | 3/1997 | Le Goff et al. | 235/462 |
| 5,612,530 | 3/1997 | Sanders et al. | 235/462 |

OTHER PUBLICATIONS

American National Standards Institute (ANSI), "Bar Code Print Quality Guideline", ANSI X3. 182–1990 (Excluding the Annex Sections), Mar. 1990.
Applied Image, Inc., "Bar Code Calibration Standards", 1993.
Quick Check Brochure, by PSC Inc, N/A.

*Primary Examiner*—Donald T. Hajec
*Assistant Examiner*—Mark Tremblay
*Attorney, Agent, or Firm*—Island Patent Associates

[57] ABSTRACT

An evaluation system having one or more scanner units providing arrangements to enable the computer controlled, rapid setup and calibration of each included scanner unit to be employed for evaluation. The calibration is effected with specific settings established using stored calibration parameter groups. The calibration parameter groups, which are previously determined using special calibration targets, are stored and available for later recall and use, as needed. The evaluation system arrangements provide for slidably mounted scanner units to enable the distance between the scanner unit and a target indicia to be adjusted to a known distance to produce a selected spot size for the subsequent evaluations. A computing unit is provided having a memory to store the plurality of calibration parameter groups, with each stored calibration parameter group available to provide parameter values to be applied for use with the included scanner units.

18 Claims, 16 Drawing Sheets

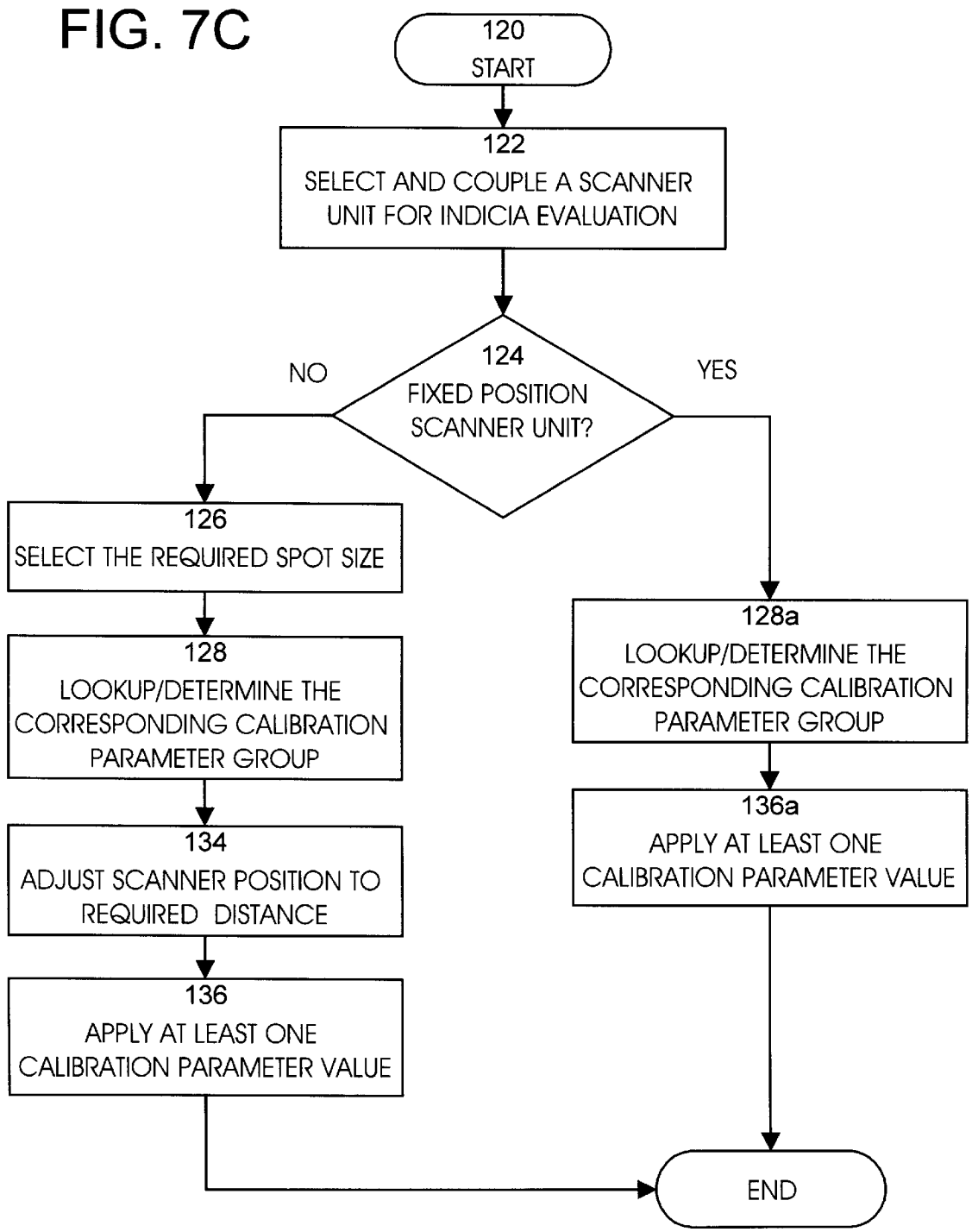

BAR CODE EVALUATION SYSTEM ARCHITECTURES AND METHODS OF CALIBRATION

BACKGROUND OF THE INVENTION

1. Field of the Invention

The present invention generally relates to bar code indicia evaluation systems. More particularly, the invention relates to flexible evaluation system architectures and associated methods of calibration.

2. Description of the Prior Art

The desire and need to verify bar code symbols is well known in the art. With the ubiquitous bar code symbol now used by virtually all inventory intensive establishments, such as warehouses, wholesale and retail stores, and the like, flexible apparatus are needed to evaluate and verify the quality of various types of bar code symbols.

Bar code indicia evaluation and verification systems currently available may be categorized into two fundamental groups: contact verifiers and non-contact verifiers. Contact verifiers are physically placed in contact with the substrate on which the symbol is printed or otherwise disposed. Non-contact verifiers are often moving beam scanner based units, which may be arranged to scan a succession of bar codes being printed, for example on a high speed printing press. For several reasons, the calibration of contact type scanner units is more straight forward than the calibration of non-contact scanners. First, the distance between a target indicia and the scan head of a contacttype verifier is fixed and known. In addition, ambient light can have a significant affect on the calibration of non-contact verifiers and must be considered when checking and adjusting the calibration of these systems. Generally, contact type verifiers will minimize the affect of ambient light by way of a "hood" or "shroud" that blocks ambient light from illuminating an indicia being scanned during evaluation. Further, contact type verifiers are generally operative to evaluate a single bar code indicia, and are manually positioned to scan the indicia.

To further complicate the evaluation of bar code indicia, a number of rigorous standards have been established in recent years. The purpose of such standards is to establish "quality" requirements and associated verification criteria for various commonly utilized bar code symbologies. The guidelines are established and administered by groups such as the Uniform Code Council (UCC) and the American National Standards Institute (ANSI). The ANSI guideline (X3.182-1990) titled "Bar Code Print Quality Guideline", which was published in 1990, has been accepted as an industry standard and has resulted in a new generation of evaluation equipment that perform "ANSI level verification".

One requirement called for by the various guidelines and standards, including the ANSI guideline, is the requirement that a specified scanning aperture or spot size must be generated by a scanner unit when evaluating different symbologies. (It should be noted that the terms "aperture" and "spot size" are to considered equivalent terms as used in the context of this disclosure.) For instance, the UCC specification titled "Quality Specification for the UPC Printed Symbol", which was published in September 1994, calls for a 6 mil scanning aperture. In contrast, "The Application Standard for Shipping Container Codes", also published by the UCC, calls for a 20 mil aperture. Further, in the absence of an overriding application standard, the ANSI guideline recommends the scanning aperture be selected based on the "density", or equivalently the width "X" of the narrowest element of the indicia to be examined. Table 1, shown below, summarizes the ANSI aperture (spot size) requirements.

TABLE 1

| ANSI Evaluation Aperture Diameters | |
|---|---|
| Nominal X Dimension (in mils) | Aperture Diameter (in mils) |
| 4 <= X < 7 | 3 |
| 7 <= X < 13 | 5 |
| 13 <= X < 25 | 10 |
| 25 <= X | 20 |

It may be noted that X is used to describe the "nominal width", or the "intended width", of the narrowest element of a bar code indicia. Further, the term "density", which is indicative of the amount of data that an indicia can encode in a given unit length, is directly related to the nominal width. As such, the terms density, X, and nominal element width are often used interchangeably.

As a result of the adoption and wide spread acceptance of the above discussed standards and guidelines, there is a need for evaluation systems that may be adjusted (and calibrated) to generate a spot size of a particular diameter. In addition, there is a need for configurable systems, and appropriate methods of calibration, in which an operator may select a particular scanner unit and have it generate a required spot size for the evaluation of a collection of indicia (possibly as a function of the particular symbology or particular X dimension of the elements of the indicia). Further, it would certainly be desirable to provide a system which may generate the required spot size while using the same scanner unit. That is, a system where the scanner unit need not be physically replaced to change from one spot/aperture size to another. As an example, prior art evaluation systems are known that employ a wand as the scanning device. These systems are sold with a plurality of wands that may, one at a time, be operatively coupled to the system. Each wand provides a specific spot size as required for the indicia to be checked. One such system offers at least six different wands that a customer may choose to purchase.

The need to provide on-line high speed verifier equipment is also well known in the art. When considering applications such as a printing press or a high speed conveyor line, there is a need to be able to operatively select and quickly calibrate at least one of a plurality of scanner units. This requirement is driven by the desire of converters and printers to provide online verification as indicia are being printed or otherwise disposed on a substrate. As a press may be reconfigured for different print jobs as often as several times a day, those skilled in the art will appreciate the advantage of being able to operatively select and couple one or more particular scanner units for a specific print job. Therefore, there is a need to have systems comprised of a plurality of scanner units, wherein one or more selected scanner units may be operatively coupled to an evaluation unit to analyze the reflectance signals generated by the selected scanner unit(s). An important consideration when employing evaluation systems having the features discussed herein, is to provide simple methods which can be executed by press operators in order to configure and calibrate systems using multiple scanner units and/or scanner units arranged to generate one of a plurality of selectable spot sizes.

It should be noted that moving beam scanning systems are known in the art that utilize techniques to extend the range over which the system can properly scan and decode an indicia. These systems "hunt" for the indicia by sequentially altering the spot size diameter or the distance at which it is focused. Further, there are systems known which can measure the distance between the scanner unit and a target indicia to adjust (optically) the scanning beam. However, such systems are altering the spot size dynamically in order to properly scan and decode an indicia. The actual spot size used that resulted in the scan/decode of the bar code indicia is not of consequence or typically even noted. Further, successive bar code indicia may be scanned with scanning spots of various sizes and not a selected specific spot size wherein the intent is to provide an accurate quantitative evaluation of indicia.

Objects of the present invention are, therefore, to provide new and improved evaluation systems, and associated methods of calibration, having one or more of the following capabilities, features, and characteristics:

the selection of a particular aperture size to be generated by a scanner unit;

the selection, operative coupling, and calibration of at least one scanner unit of a plurality of scanner units available for the evaluation of bar code indicia;

enable the aperture size generated by a scanner unit to be varied by slidably adjusting the distance between the scanner unit and the target indicia;

including an adjustment module to enable the computer controlled adjustment of the distance between a scanner unit and target indicia to be evaluated;

having a computing and evaluation means to support the automatic adjustment and calibration of one or more scanner units;

the quick and easy adjustment and calibration of at least one of a plurality of scanner units using stored or determined calibration parameter values; and relatively low cost implementation using primarily off-the-shelf components and devices that are readily available.

SUMMARY OF THE INVENTION

In accordance with the invention, a scanning apparatus is disclosed for use in the evaluation of a target bar code indicia. The evaluation is conducted using a selected spot size generated by the scanning apparatus. The scanning apparatus is comprised of a scanner unit, along with support means arranged to slideably support and position the scanner unit. The support means are provided to enable the distance between the scanner unit and the target indicia to be adjusted to a required distance to generate the selected spot size. The apparatus may further include a computing and evaluation means that is operatively coupled to the scanner unit. The computing and evaluation means provides a memory unit to store a plurality of calibration parameter groups. Each of the calibration parameter groups is comprised of a plurality of calibration parameter values that may be retrieved from the memory unit and applied to calibrate the computing and evaluation means for the evaluation of the target indicia with the scanner unit positioned at the required distance to generate the selected spot size.

Further disclosed in accordance with the invention is a system to evaluate the quality of a target indicia. The system is comprised of a plurality of scanner units and a computing and evaluation system configured to enable at least one scanner unit to be selected and operatively coupled to the system in order to evaluate the target indicia. The computing and evaluation system includes a memory unit to store a plurality of calibration parameter groups therein. The scanner units may be fixed position or slidably supported by suitable support means. Each selection of a scanner unit results in the retrieval of one or more calibration parameter groups, and possibly includes the determination of additional calibration parameter values using known relationships. One or more of the retrieved and/or determined parameter values are applied to calibrate the system for operation with the selected scanner units.

Methods are provided to determine and organize the various calibration parameter values of the plurality of the calibration parameter groups. The parameter values may then be stored in the memory unit for later retrieval and application. Methods for utilizing the calibration parameter groups to configure and calibrate the scanning apparatus and the evaluation systems of the present invention are disclosed, as are methods to determine the actual calibration parameter group values.

BRIEF DESCRIPTION OF THE DRAWINGS

In the drawings, like elements are assigned like reference numerals. The drawings are briefly described as follows.

FIG. 7C is a flowchart of a method to configure and calibrate an embodiment of the invention arranged with a plurality of scanner units, some of which may be slidably mounted and others of which may be fixed position.

DETAILED DESCRIPTION OF THE INVENTION

Figure 1:
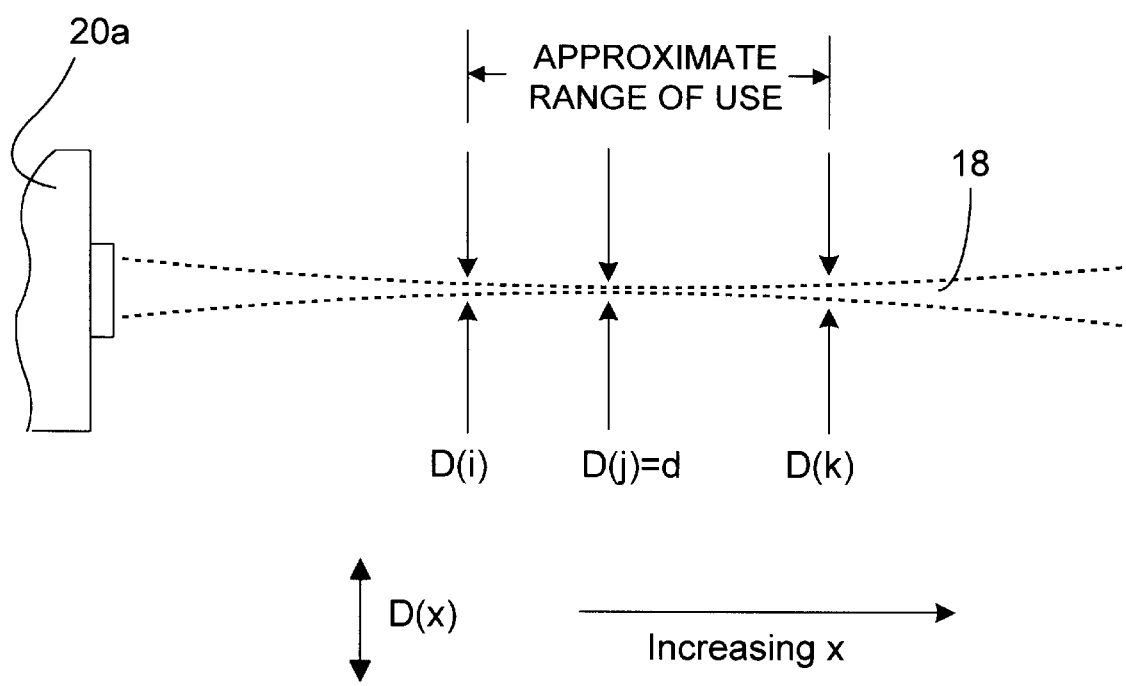
FIG. 1 illustrates a plan view of a typical scanning beam generated by a scanner unit.

Referring now to FIG. 1, there is illustrated a plan view of scanning beam 18 generated by a scanner unit 20a. As shown, the diameter of the beam varies as a function of the distance x from the scanner. Three discrete positions are illustrated that correspond to possible distances at which a target indicia may be suitably positioned to be scanned with a specific aperture or spot size. At the distance when x is equal to 'i', the size of the spot that will illuminate a target indicia placed substantially perpendicular to the scanning beam 18 is given by D(i). As such, 'i' represents a position relatively close to the scanner unit 20a wherein a relatively "large" spot size may be generated. It may be noted that the focal depth-of-field of a scanning device, such as scanner unit 20a, is a function of, and proportional to, the X-dimension of an indicia. Accordingly, if the position at 'i' were to be indicative of the minimum distance wherein the target indicia may be properly scanned, 'i' may be utilized to define the approximate depth-of-field of a scanning device.

Returning to FIG. 1, the distance at 'j' defines the point at which the target indicia may be scanned with the smallest spot size the scanner unit 20a can produce. For compliance with the ANSI specification, the diameter D(j), which is often termed the waist diameter "d", imposes a lower limit on the width of the narrowest element of the target indicia being evaluated. However, it can clearly be seen that by varying the distance between the scanner unit 20a and a target indicia, a spot size maybe selected for use in scanning and evaluating one or more indicia. The distance where x is equal to 'k' represents another position wherein a relatively large spot size (with respect to the waist diameter) may be generated by the scanner. Therefore, it can be seen that the spot sizes which are produced within the range i<x<j, are approximately equivalent to the spot sizes which are produced within the range of say j<x<k. One notable distinction between these two ranges is the intensity level of reflected light received by the scanner unit 20a while scanning an indicia in one range versus the other. The intensity level of the closer range (i.e., i<x<j) is greater than for the outer or more distant range. In addition, it should be understood that a predetermined distance value useful to generate a selected spot size may correspond to either of two distinct distances, one on each side of the waist position. Skilled individuals will further recognize that if a group or plurality of distances are known to have associated therewith specific spot sizes, other distances and corresponding spot sizes may be determined using established and known relationships. For example, to determine a spot size that is near a "known" spot size, say within ±20%, a linear relationship (or proportion) may be employed. Those skilled in the art will recognize still other relationships that may be employed to determine a desired spot size between predetermined distances having corresponding known spot sizes.

Figure 2A:
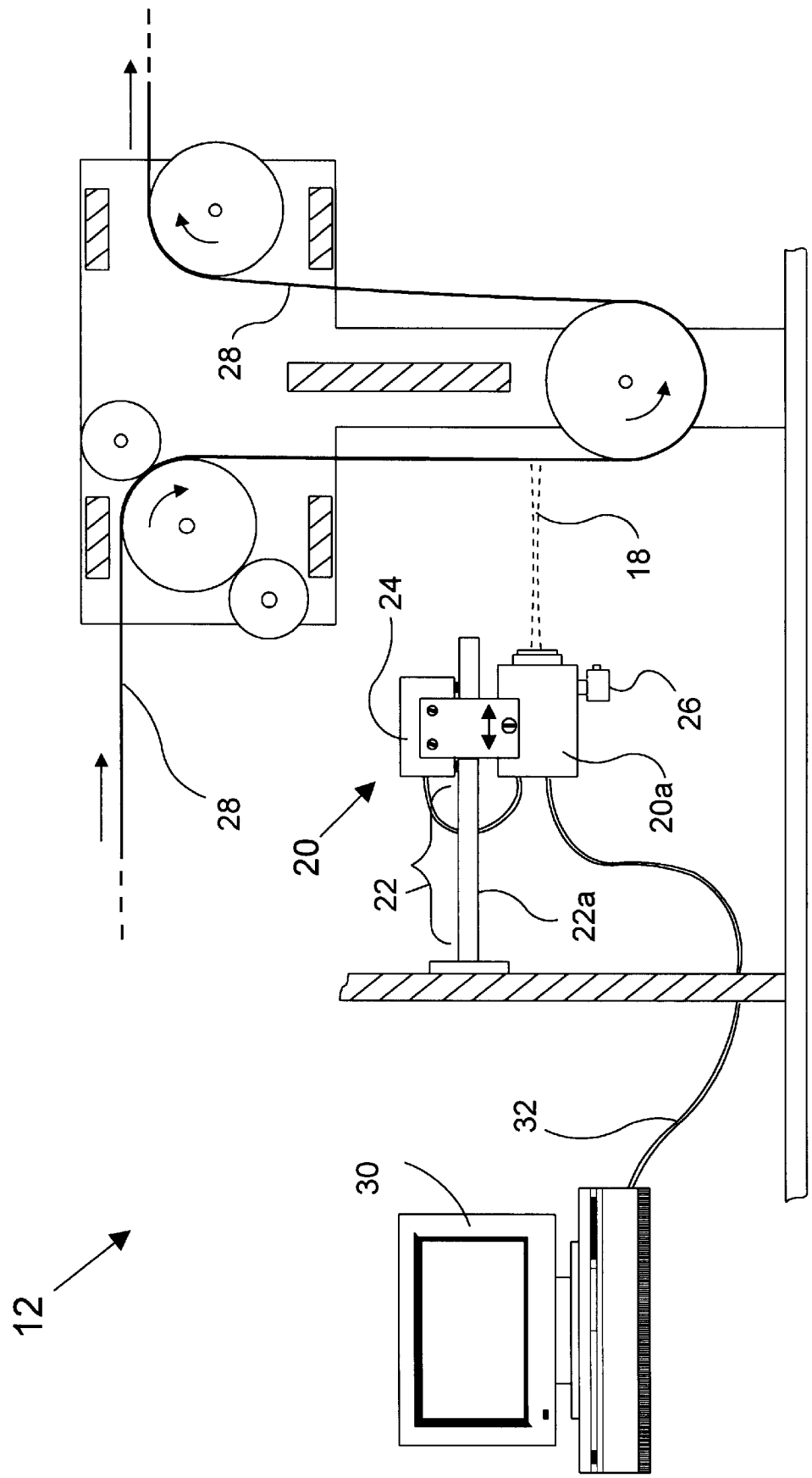
FIG. 2A depicts an embodiment of the invention deployed to scan and evaluate indicia being printed on a moving substrate.
Figure 3A:
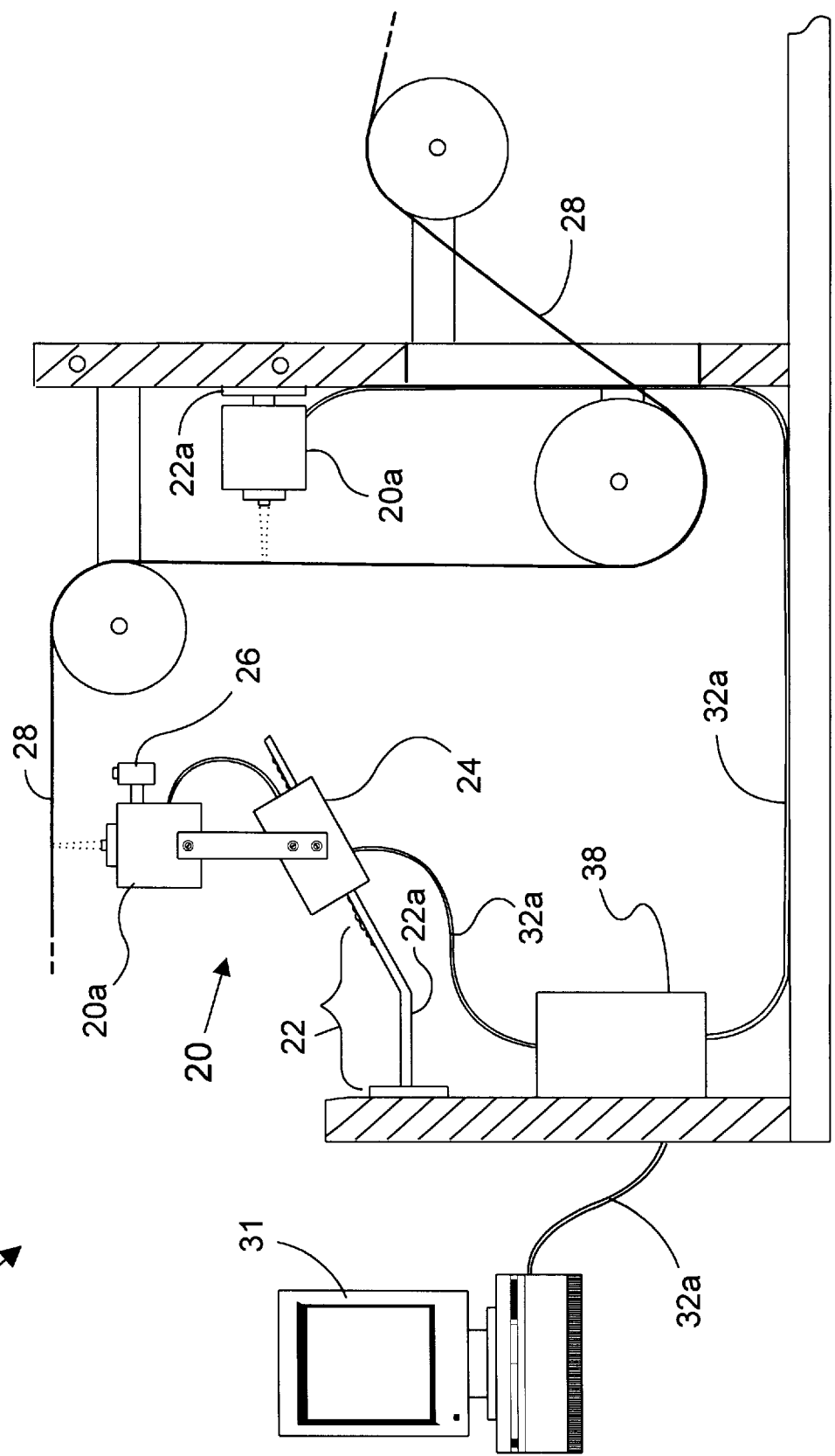
FIG. 3A depicts an embodiment of the invention having a plurality of selectable scanner units and/or scanning apparatus arranged to scan and evaluate indicia being printed at various locations on a moving substrate.

Referring now to FIG. 2A, there is illustrated an embodiment of the invention deployed to scan and evaluate indicia being printed on a moving substrate 28, such as a continuous (paper) web running through a printing press. As shown, the evaluation system 12 includes a scanning apparatus 20 comprised of a scanner unit 20a and a slide bar 22a. Slide bar 22a represents a support means 22 arranged to slidably support the scanner unit 20a to enable the distance between the scanner and the target indicia to be adjusted to a required distance. The required distance is chosen to ensure that a selected spot size is generated by the scanner unit 20a. Typically a distance will be retrieved (e.g., from a memory unit) or determined (by way of a known relationship) so that the scanner unit 20a generates a selected spot size. It should be understood that although the scanning beam 18 is illustrated as illuminating the substrate 28 (and any indicia disposed thereon) with a substantially perpendicular orientation, this is generally not the case in practice. For example, several evaluation and quality standards, including the ANSI guidelines, require the source of "flood incident irradiation" to be oriented at 45 degrees from a perpendicular to the substrate surface. Therefore, the orientation depicted in FIG. 2A, as well as FIG. 3A, is illustrative only.

Further included in FIG. 2A is an adjustment module 24 arranged to adjust the distance between the scanner unit 20a and the target indicia (not visible) disposed on the moving substrate 28. The adjustment and calibration of the position of scanner unit 20a to a selected distance may be provided by the combination of support means 22 (e.g., the slide bar 22a) and the adjustment module 24. Such arrangements, which are well known in the art, include devices such as ball and screw adjustment mechanisms, or rack and pinion mechanisms. Those skilled in the art will appreciated the availability of these and other suitable knowl arrangements and devices. In addition, the adjustment module 24, which may include a portion of the support means 22, may be provided by a hand controlled adjustment means or a (remote) computer controlled adjustment means. Hand controlled adjustment modules may have an analog or digital readout, to enable an operator to accurately adjust the distance between the scanner unit 20a and the target indicia. Alternately, the adjustment module 24 may be configured with a suitable motorized device to enable the automatic and computer controlled adjustment of the distance between the scanner module 20a and target indicia. In either case the actual distance may be measured by the use of simple and inexpensive systems, such as an ultra sonic measurement unit 26, or the like. Another simple "measuring" approach would be to correlate position changes in units called "steps", such as those provided by a stepper motor based adjustment means 24. With the latter method, the actual distance may be selected as a number of discrete steps, where each step corresponds to a known increment of distance.

Additionally shown in FIG. 2A is a computer and evaluation means 30 coupled by coupling means 32 to the scanning apparatus 20. This arrangement wherein a coupling means 32 is employed to link components of a non-contact scanner based evaluation system is common. Coupling means 32 may be provided by any suitable conductive or optical cable, or the like.

Scanner based evaluation systems typically process reflectivity signals and associated data samples generated by scanning the indicia. To support this processing, evaluation circuitry, in the general form of an evaluation unit or evaluation means, may be employed. As known in the art, the evaluation means may be provided by a plug-in "expansion card" inserted in a personal computer (PC) slot. For example, the TruSpec 100 bar code verifier from Webscan Inc., is a PC based embodiment utilizing a plug-in card. The evaluation and computing means 30 of FIG. 2A, may be provided by such a system architecture. However, it should be understood that the evaluation and computing means 30 may alternately be provided by two distinct units comprised of a computing and control means and a separate evaluation means (both not explicitly shown). The computing and control means may include an operator interface, such as a keyboard and video monitor. For any embodiment of the computing and evaluation means 30 of the present invention, the functions provided are equivalent, and may include enabling an operator to configure, calibrate and operate the system, support the automatic adjustment of the position of scanner unit 20a to a required distance to produce a selected spot size, and to produce evaluation results based on the scanning of one or more target indicia. The evaluation results may be in the form of hard or soft output devices such as a printed report, or a file created on a floppy/hard disk, or the like.

Figure 2B:
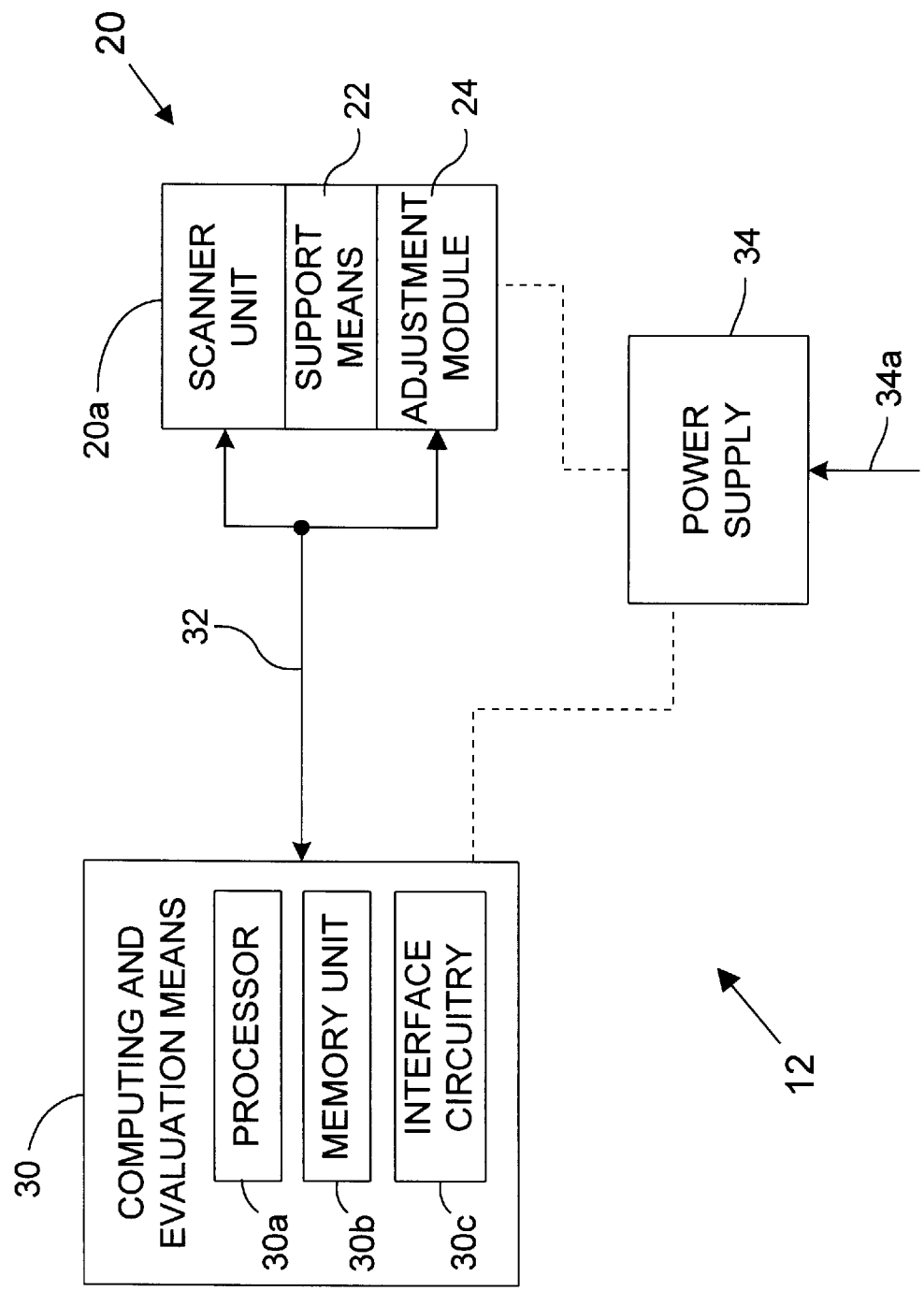
FIG. 2B provides a block diagram of the embodiment of FIG. 2A.

Referring now to FIG. 2B, there is provided a block diagram of the embodiment of FIG. 2A. Shown are the scanner unit 20a, support means 22, and adjustment module 24, collectively defined as the scanning apparatus 20. Coupling means 32 operatively couples the scanning apparatus 20 to the computing and evaluation means 30. The computing and evaluation means 30 comprises a processor 30a, a memory unit 30b and interface circuitry 30c. The processor 30a will function to provide the computing and control functionality, and may be provided by many well known microprocessor or microcontroller devices commercially available. The memory unit 30b will provide non-volatile and volatile memory structures to support the system operation. One function provided by the memory unit 30b will be to enable calibration related values and parameters to be stored and subsequently retrieved. A discussion of "calibration parameter groups", which are comprised of a plurality calibration parameter values, will be provided when referring to FIGS. 6A, 6B, and 6C. The interface circuitry 30c is included to operatively couple the scanning apparatus 20 to the computing and evaluation means 30.

Also shown in FIG. 2B is a power supply 34 having a power source 34a coupled thereto. The functions provided by the power supply 34 include the regulation and/or filtering of the power source 34a coupled to the evaluation system 12 including the scanning apparatus 20 and the computing and evaluation means 30.

Referring now to FIG. 3A, there is illustrated an embodiment of an evaluation system 12a of the invention employing a plurality of scanner units 20a. Each scanner unit 20a being selectable to be operatively coupled to an evaluation unit such as computing and evaluation system 31. As shown, the plurality of the scanner units 20a may be arranged to scan both sides of the substrate 28. However, it should be noted that similar embodiments of the evaluation system 12a, may be arranged to scan a single side of the substrate 28. An interface unit 38 is provided to support the operative coupling of one or more scanner units 20a (or scanning apparatus 20) to the computing and evaluation system 31. The functions of the computing and evaluation system 31 are equivalent to the functions provided by the computing and evaluation means 30 of FIGS. 2A and 2B. The operative coupling of the components of the embodiment of FIG. 3A, including the interface unit 38, the computing and evaluation system 31, and the scanner units 20a is provided by coupling means 32a. The function of coupling means 32a is equivalent to the function of coupling means 32 of FIG. 2A and 2B.

Figure 3B:
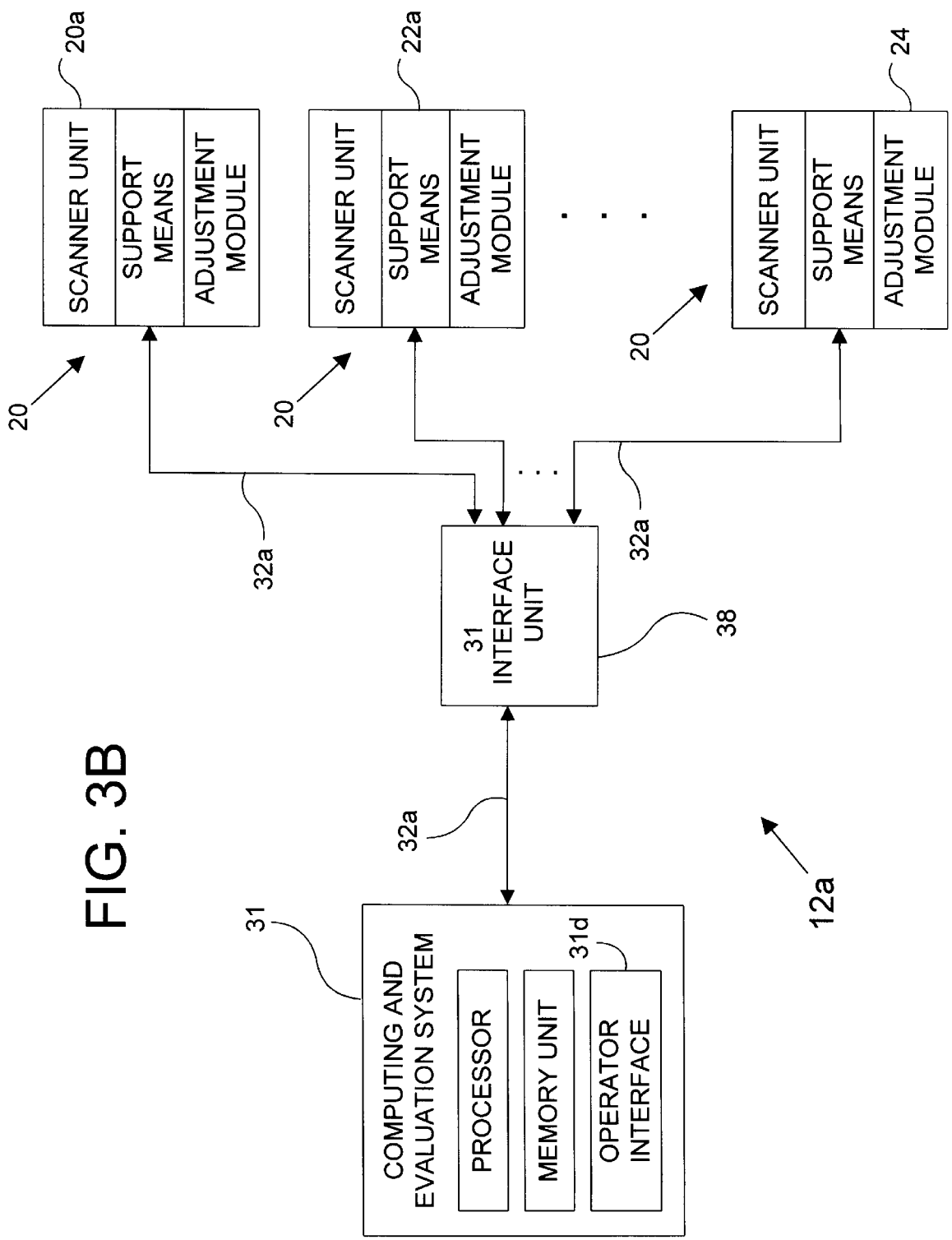
FIG. 3B provides a block diagram of the embodiment of FIG. 3A.

It must be understood that the interface unit 38 of FIGS. 3A and 3B may be incorporated within the computing and evaluation system 31. In a preferred embodiment of the present invention the interface unit 38 required to support the selection and operative coupling of one or more scanner units 20a may be provided on a plug-in card in combination with an evaluation unit (not shown). Skilled individuals will recognize the variety of available circuit components and configurations that may be employed to provide the functionality of the interface unit 38. Devices such as multiplexers and analog switches, for example, are well known in the art and readily available.

Referring now to FIG. 3B, there is illustrated a block diagram of the embodiment of FIG. 3A. Shown are a plurality of scanning apparatus 20, each of which may be comprised of a scanner unit 20a, a support means 22, and an adjustment module 24. Each scanning apparatus 20 is coupled to the interface unit 38 via coupling means 32a, which is in turn coupled to the computing and evaluation system 31. Although, functionally similar in operation to the embodiment of FIGS. 2A and 2B, the embodiment of the invention provided in FIGS. 3A and 3B dictate the inclusion of additional calibration requirements and considerations. For example, the operating characteristics of scanner units typically vary from one unit to another. Beam source intensities, receiver devices and circuit variations, optical tolerances, and the like, are all known to cause variations in the signals produces by each of a plurality of scanner units. In order, to properly evaluate indicia, such as bar code symbols, the evaluation portion of the system must be calibrated to accurately process the signals produced by the particular scanner unit(s) 20a that are operatively coupled to the computing and evaluation system 31. A key feature of the present invention is to provide calibration parameter groups, comprised of a plurality of calibration parameter values. The calibration parameter groups may be retrieved as needed and applied to calibrate the computing and evaluation system 31, as well as one or more selected and operatively coupled scanner units 20a and/or scanning apparatus 20, to accurately scan and evaluate indicia. Again, a discussion of calibration parameter groups will be provided when referring to FIGS. 6A, 6B, and 6C.

Figure 4:
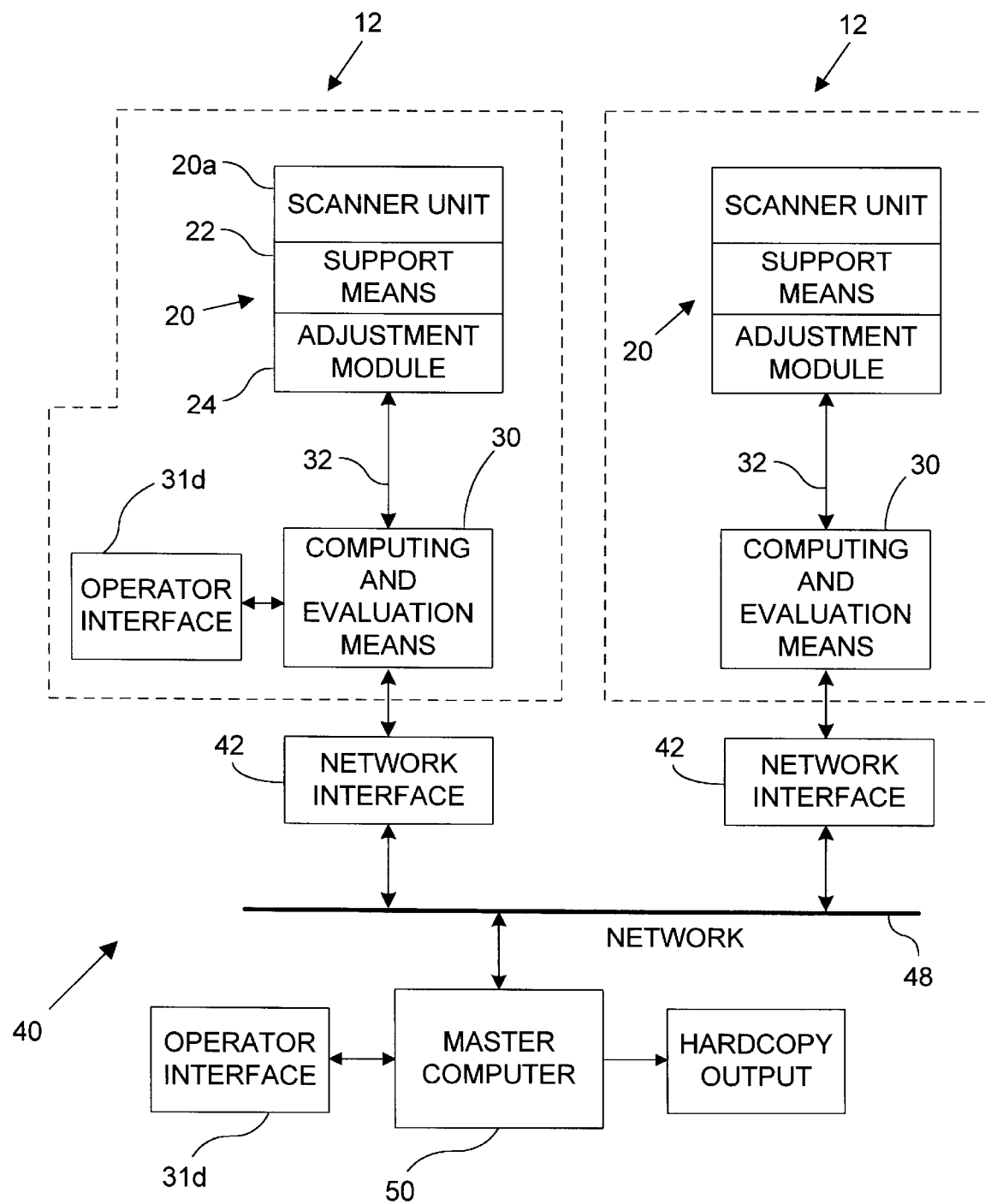
FIG. 4 provides a block diagram of an embodiment of the invention having a plurality of "distributed" scanning apparatus linked by a suitable networking means.

Referring now to FIG. 4, there is provided yet another embodiment of the present invention. Shown are scanning apparatus 20 linked via coupling means 32 to computing and evaluation means 30. This arrangement is functionally equivalent to the system 12 embodiment of FIG. 2B. However, the embodiment of FIG. 4 is structured to provide a "distributed" evaluation system 40, comprised of one or more evaluation systems 12, that may be installed, for example, in a large facility comprised of a plurality of bar code indicia printing means. Although FIG. 4 provides slidably mounted scanning units 20a, it should be understood that a distributed system comprised a mix of system 12 embodiments (of FIG. 2E) and system 12a embodiments (of FIGS. 3A and 3B) is contemplated as being within the scope of the present invention. In addition, the inclusion of the operator interface 31d of FIG. 4, which is coupled to the computing and evaluation means 30, may or may not be required for a given installation.

An important feature of the embodiment of FIG. 4 is the inclusion of a network means 48 and suitable network interface (circuitry) 42, which permits each evaluation system, such as system 12, to be connected to enable the exchange of information between a master computer 50 and the plurality of evaluation systems 12 within the distributed evaluation system 40. A number of operational variations are possible with this structure. For example, the calibration parameter values for each system 12 may be centrally stored and retrieved from the master computer 50 as required. Alternately, the parameters may be copied and retained by master computer 50 in the event there is a catastrophic failure of computing and evaluation means 30 (resulting in the "local" copy of the calibration parameter values being corrupted and lost). Yet another feature of the evaluation system 40 is that a single operator may monitor the status/ evaluation results, and further control a plurality of systems 12/12a associated with the printing means of the facility that are producing bar code indicia. Accordingly, the operator interface 31d linked to the master computer 50 may be utilized to enable the centralized operation of the evaluation system 40. Still yet another feature of the embodiment of FIG. 4 is the ability to collect and process evaluation results at a single location, and possibly archive and generate hard copy outputs at this single location.

Skilled individuals will recognize a number of modifications and variations possible for the architecture of the embodiment of FIG. 4. For example, the computing and evaluation means 30 may connected via ethernet-type networks or connected by other known communication links such as an IEEE-488 interface, an optical/infrared link, one or more wireless communication links, or the like.

Figure 5A:
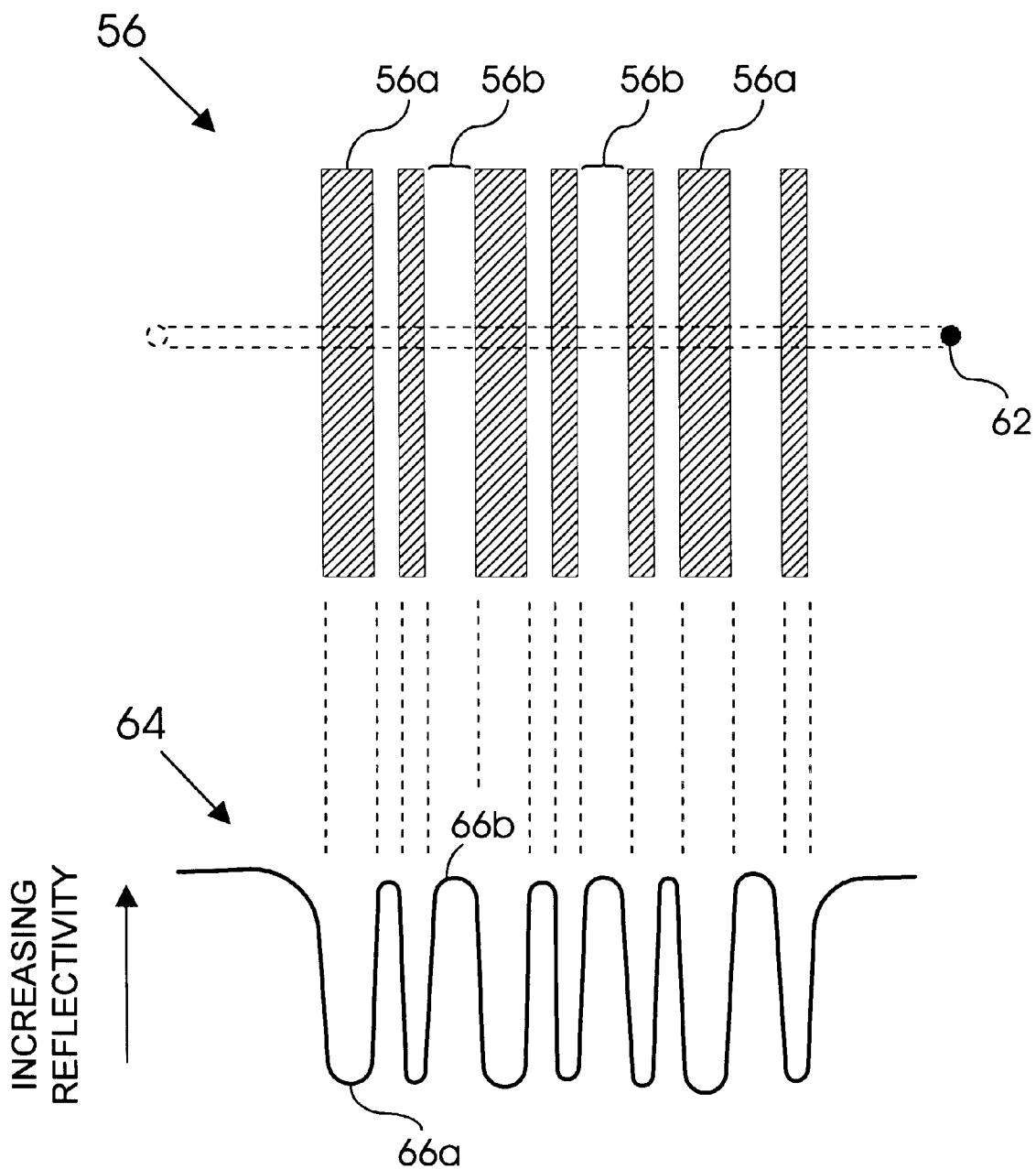
FIG. 5A provides a view of an indicia being scanned and a resulting scan reflectance profile (SRP) signal.

Referring now to FIG. 5A, there is illustrated a bar code indicia 56 comprised of a plurality of adjacent and parallel bar elemets 56a, having space elements 56b sandwiched therebetween. Collectively, the bar elements 56a and space elements 56b will be termed "elements 56a/56b". The bar code indicia 56 may be "scanned" by sweeping a scanning spot 62 at a substantially constant speed across the plurality of elements 56a/56b (as shown) to produce a scan reflectance profile (SRP) signal 64 corresponding to the scanned indicia 56. The SRP signal 64 provides an indication of the levels of reflectivity throughout the indicia 56. The term "level of reflectivity" may be defined as the amount of incident optical energy (supplied by the scanning spot 62) reflected from the elements 56a/56b and received by a detection means of the scanner unit 20a as the indicia 56 is scanned. Thus, it can be seen by examining the SRP signal 64, that the level of reflectivity of a bar element 56a is small when considered with respect to the level of reflectivity of a space element 56b.

It must be understood that the relative difference in the levels of reflectivity associated with the bar elements 56a and the space elements 56b is sufficient to properly scan and decode a bar code indicia to determine the data pattern encoded therein. For instance, an indicia embodied with gray bars having a 20% reflectivity and white spaces having an 80% reflectivity is as scannable as an indicia embodied with black bars having a 5% reflectivity and gray spaces having a 65% reflectivity. The relative difference in reflectivity (between the bars and spaces) for each indicia is 60%. A number of prior art evaluation systems, such as the system disclosed in U.S. Pat. No. 5,218,190 to Hardesty et al., would not be able to distinguish between these two "pairs" of reflectivity levels. As such, the Hardesty system provides a difference reflectivity measurement/evaluation. However, in order to fully evaluate an indicia and provide a quantitative evaluation result, for example in compliance with the ANSI guidelines, the "absolute" reflectivity of the elements must be determined. Moreover, the absolute reflectivity may be desired in order to adjust ink color, ink density, etc. To accurately determine the absolute reflectivity of the elements of an indicia, for example the indicia 56, a scanning means must be calibrated so that the intensity level of reflected light received by the scanning means can be associated with an absolute level of reflectivity.

Figure 5B:
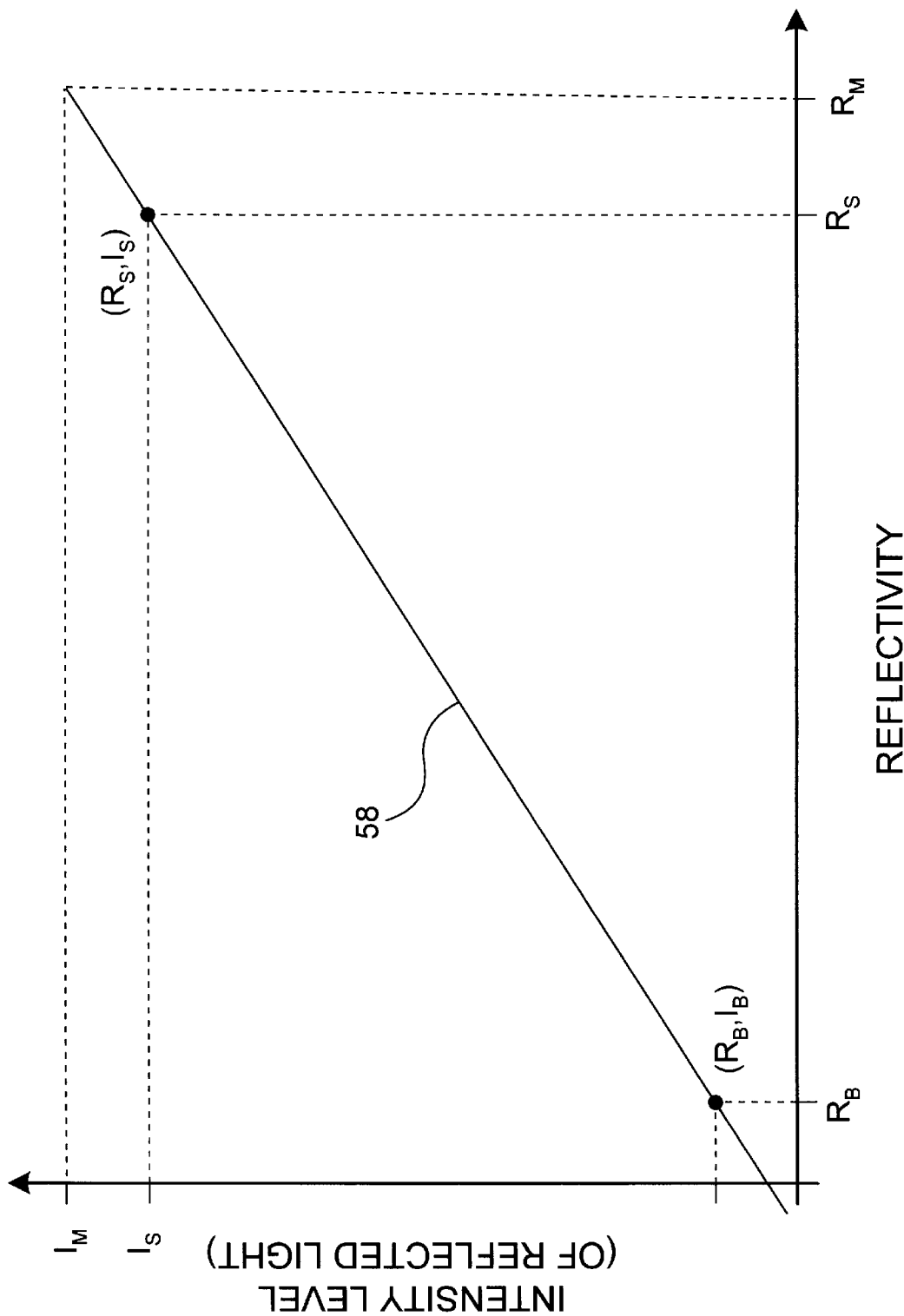
FIG. 5B is a graph of reflectivity versus reflected light intensity.
Figure 5C:
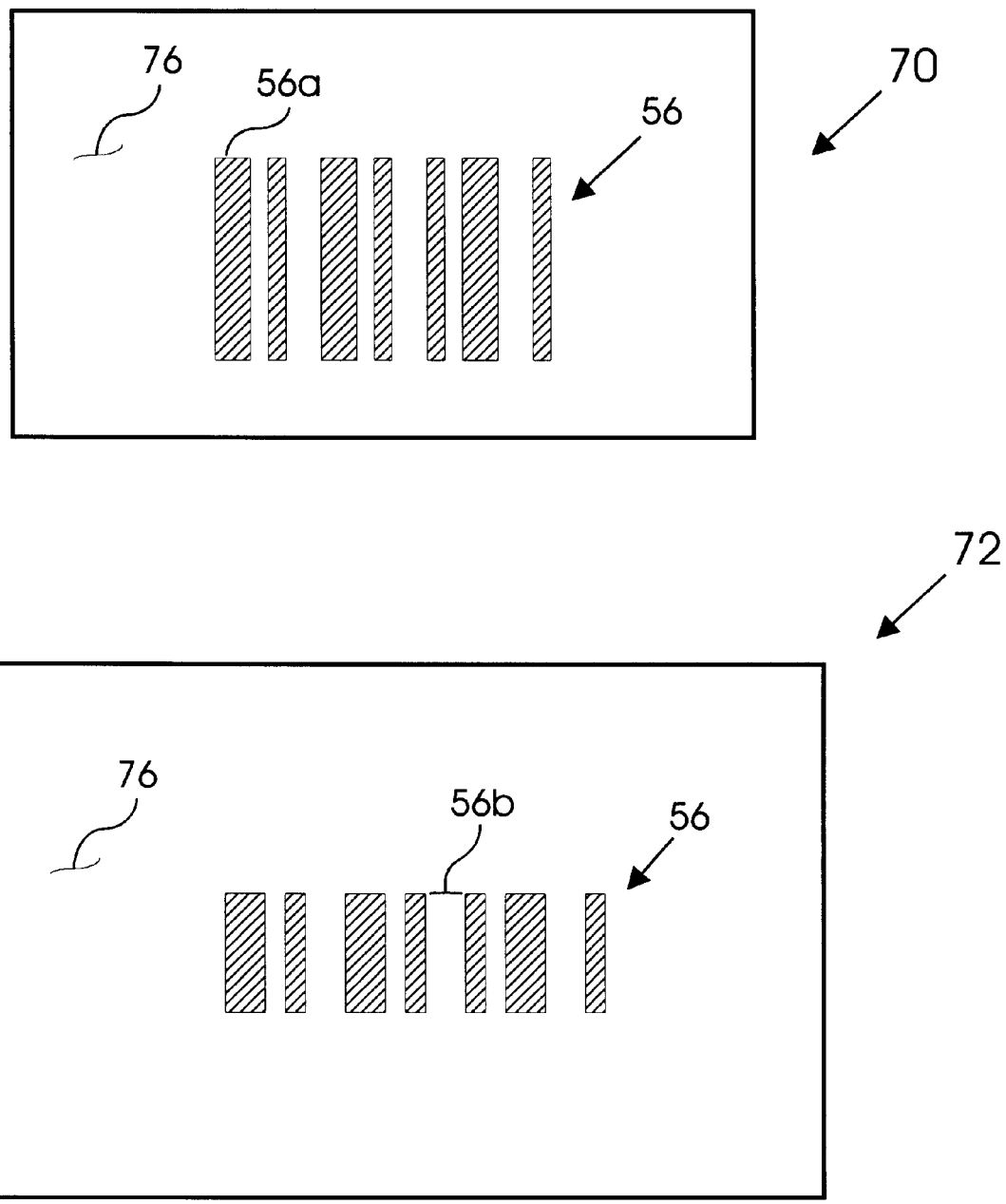
FIG. 5C depicts calibration targets appropriate for use with the invention.

Referring now to FIG. 5b, a plot of intensity level versus reflectivity is illustrated. As shown, the relationship between the intensity level received by, for example, the scanner unit 20a, is linearly related to the reflectivity of elements of a scanned indicia, and visa-versa. Further, if a target indicia, such as the calibration target 70 of FIG. 5C, is available having one or more known levels of reflectance, then an examination of the SkP signal 64 produced by scanning such a target will enable corresponding intensity levels received to be calibrated. For example, assume the calibration target 70 is provided having bar elements 56a with a known reflectivity of 17%. Further, assume that a second calibration target say, target 72 of FIG. 5C is provided having space elements 56b with a known reflectivity of 82%. Then, if the calibration targets 70 and 72, respectively, are scanned by an evaluation system such as system 12 or 12a, the intensity level of the space elements 56b given by $I_s$ (in FIG. 5B) and the intensity level of the bar elements 56a given by $I_B$ may be calibrated to an "absolute" scale.

It should be understood that the terms "intensity level" and "intensity value" may henceforth be defined as a calibrated level of intensity having an associated known, or easily determined absolute level of reflectivity (i.e. a reflectivity value). Thus, if the scanning apparatus of FIG. 2A has been calibrated, the system is capable of determining the (absolute) reflectivity of the elements of a scanned bar code indicia.

Returning to FIG. 5B, it is important to note that to determine the relationship between the intensity level of received light and the associated reflectivity of the scanned elements, two data points must be determined. These are shown and labeled as $(R_B, I_B)$ and $(R_S, I_S)$, and respectively correspond to the scanning of a bar element and a space element, each having a known level of reflectivity. It should further be understood that each point may be determined by scanning a plurality of distinct calibration targets, or a single calibration target having a plurality of known absolute reflectivity levels. Once the values associated with these points have been determined by scanning suitable calibration targets, an evaluation system, such as system 12 or 12a, may be used to accurately scan and evaluate one or more bar code indicia. In addition, since the relationship may be assumed to be substantially linear, the determination of points $(R_B, I_B)$ and $(R_S, I_S)$ define an equation for a line 58 passing through the points. Once the equation for line 58 is available, any measured/received intensity level can be used to determine a corresponding absolute level of reflectivity. Skilled individuals will appreciate that the actual intensity level received by the scanner units 20a may be provided as an electrical voltage or current, which may then be sampled and digitized for use in the quantitative evaluation of bar code indicia.

Turning now to FIG. 5C, there are illustrated two calibration targets 70 and 72. As shown, each is comprised of a substrate 76 and at least one bar code indicia 56 disposed on the substrate. Somewhat similar targets or standards are known in the art. For example, the Hardesty patent (5,218,190), discloses a calibration standard having a plurality of spaced low reflectivity bar-like elements wherein each bar element is of an equal width and equally spaced (by the same width). The calibration standards provided by Hardesty yield a non-decodable pattern of equally spaced bars and spaces and further have associated therewith two "relative" levels of reflectivity. The bar elements provide a low level of reflectivity that is either the lowest "possible" (using a color of absolute black) or the highest reflectivity possible for bar elements (using a gray color) while still being readable by the disclosed verifier. The space elements provide a second (relative) level of reflectivity for each of the Hardesty calibration standards. Further, the SRP signals produced when each Hardesty calibration standard is scanned are utilized to determine a "difference" between the intensity levels of reflected light received from the bars and from the spaces. Thus, the Hardesty standards provide "a difference in contrast levels" which is employed to calibrate the disclosed verifier system to determine relative differences in contrast levels. By comparison, the calibration targets 70 or 72 have at least one known "absolute" level of reflectivity (e.g. one or more elements with known percent reflectivity). Thus, when scanned, each of the calibration targets 70 and 72 provides one or more of the points such as ($R_B$, $I_B$) or ($R_S$, $I_S$) as shown in FIG. 5B. Accordingly, if the calibration target 70 has just one calibrated absolute level of reflectivity, at least two such calibration targets must be scanned to calibrate the evaluation systems of the present invention. In addition to having one or more known absolute levels of reflectivity, each of the calibration targets also includes at least one decodable bar code indicia disposed thereon, having a known data pattern. The known data pattern may be employed to verify the correct target has been scanned by an operator or technician, or alternately to create a record of exactly which target or targets were scanned during the last calibration procedure. Skilled individuals can provide yet other uses for the provision of a collection of bars and spaces (e.g. an indicia) having a decodable data pattern therein.

There is one distinct advantage to the use of calibration targets 70 and 72 having just a single known and calibrated level of reflectivity. If a system or group of systems requires a plurality of reflectivity calibrated targets having say, three known absolute levels of reflectivity for the bar elements (of each of the three targets) and three known absolute levels for the space elements, it will be necessary to manufacture a total of nine calibration targets when utilizing calibration targets having two (2) known levels of reflectivity. However, if utilizing targets with a single known absolute level of reflectivity, only six targets would be required. Another possible advantage of the disclosed calibration targets 70 and 72 is the relative ease of manufacturing calibration targets or standards wherein only one absolute level of reflectivity must be calibrated or known. The application of calibration targets 70 and 72 will be further discussed when referring to FIGS. 7A through 7C.

It will be appreciated that an alternate and very simple form of calibration target (not shown) may be provided by targets employing a single color "patch". That is, a single black-patch target and a separate target having a single white-patch may be employed as calibration targets of the present invention. Of course, each patch disposed on a target must have a known absolute level of reflectivity. In the case of these simple targets, the patch may or may not cover the entire (scannable) surface of the calibration target. Those skilled in the art will recognize the important characteristics that distinguish calibration targets known in the art from those of the present invention, such as targets 70 and 72, are the provision of i) one or more known and calibrated "absolute" levels of reflectivity, and ii) having at least one decodable bar code indicia disposed thereon.

Figure 6B:
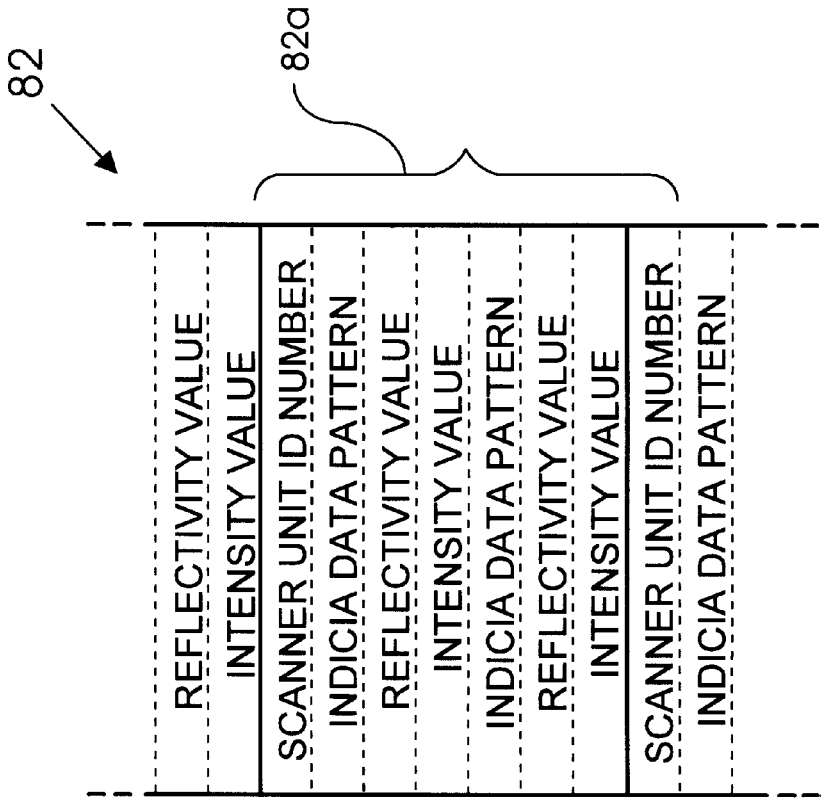
FIGS. 6A, 6B, and 6C depict embodiments of data structures useful to organize and retrieve calibration parameter groups.
Figure 6A:
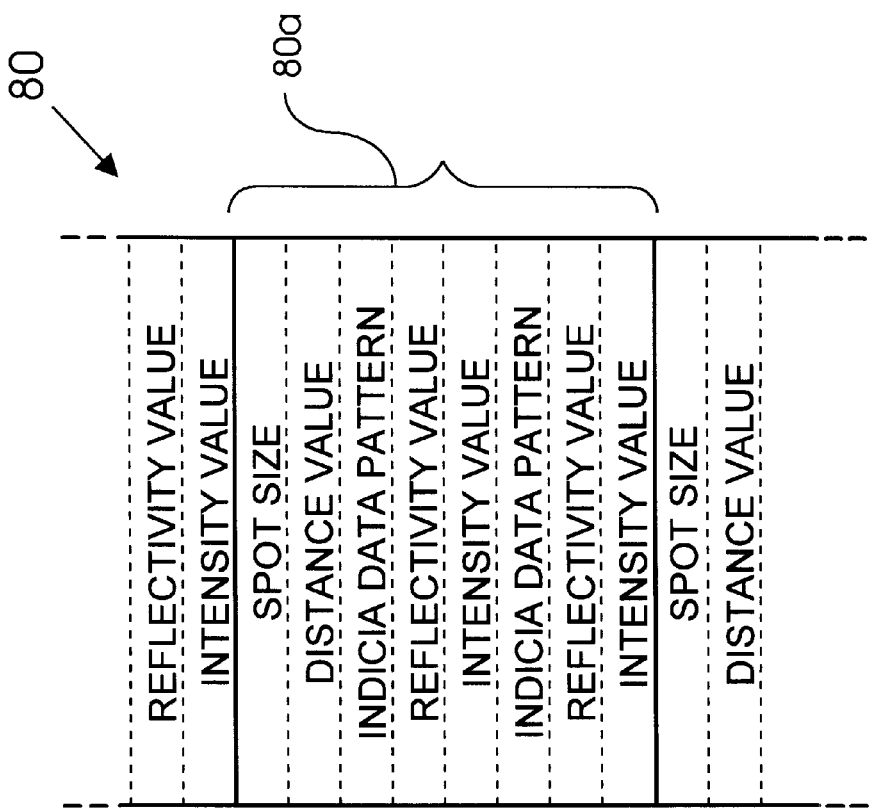
Figure 6C:
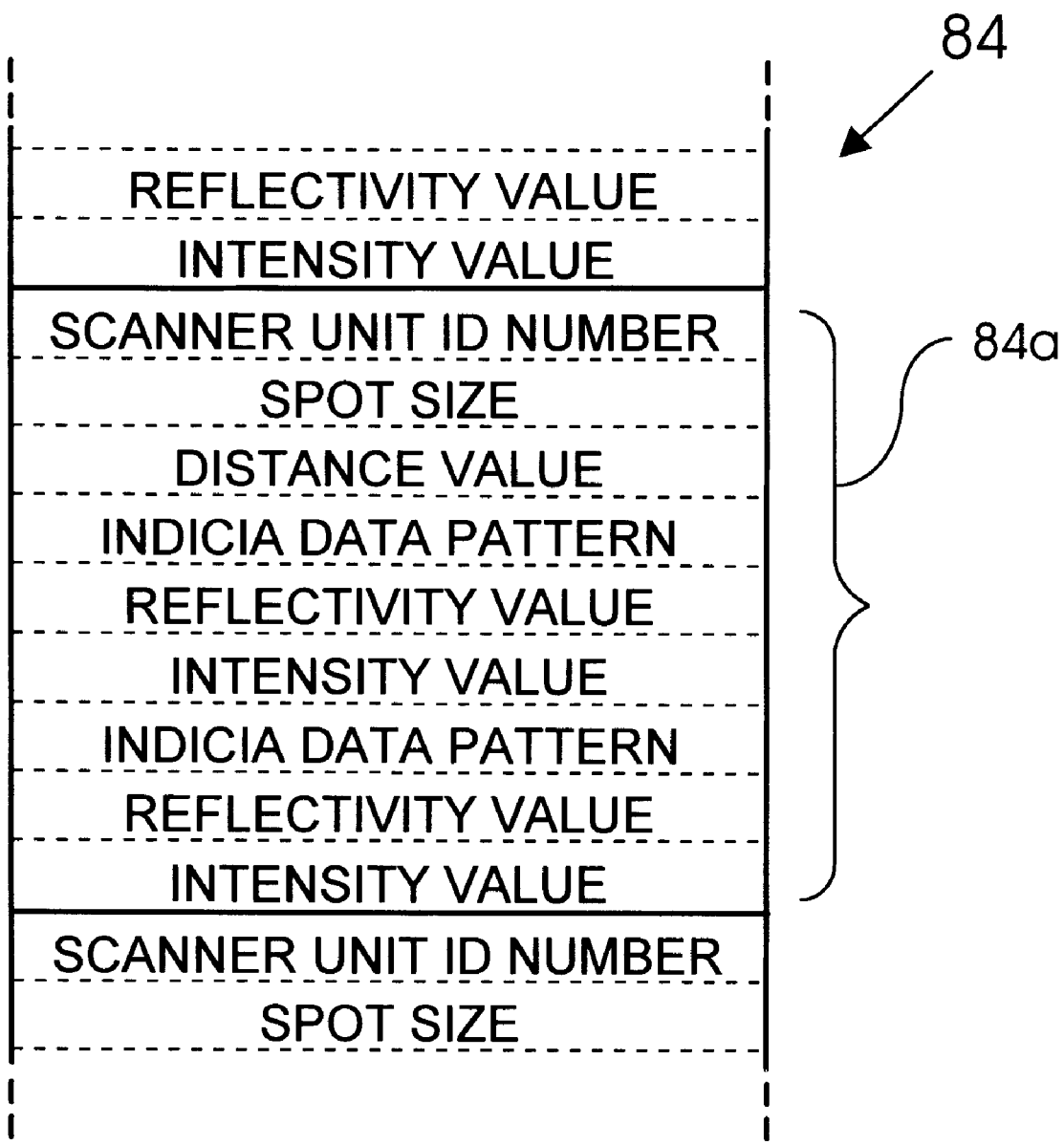

Referring now to FIGS. 6A through 6C, there are shown embodiments of data grouping structures that may be employed to organize a collection of calibration parameter values to form one or more calibration parameter groups. The term "data structure" will be used to indicate an organization and structure for storing and retrieving one or more calibration parameter groups of the present invention. Referring specifically to FIG. 6A, there is illustrated an embodiment of a data structure 80 comprised of a plurality of calibration parameter groups 80a. The data structure 80 may be employed with an evaluation system comprised of the scanning apparatus 20, or the like, that enables the distance between the scanning unit 20a and a target indicia to be adjusted to provide a selected spot size. As shown the calibration parameter group 80a is comprised of calibration parameter values including a spot size (value), a corresponding required distance value, and one or more sub-groups including an indicia data pattern with an associated absolute reflectivity value (e.g., percent reflectivity) and intensity value (e.g., a voltage). The indicia data pattern, reflectivity value and intensity value may be provided for each calibration target 70/72 employed for the calibration of an evaluation system such as system 12. When the evaluation system 12 is first installed at a specific location, certain calibration parameter values such as the required distance value or the reflectivity and intensity values may be stored in the memory unit 30a of the computing and evaluation means 30 (of FIG. 2B). One or more of these parameter values may later be retrieved from the memory unit 30a to calibrate the evaluation system 12 for the scanning and evaluation of target indicia with a selected spot size. It is important to note the calibration parameter values of a calibration parameter group, such as 80a, may be directly applied and/or indirectly employed to "determine" one or more parameter values using known relationships. That is, a value may be determined by processing at least one known parameter value of the calibration parameter group. For example, if the data structure 80 includes calibration parameter groups 80a corresponding to spot sizes of 8 mils and 10 mils, those skilled in the art will appreciate that known relationships may be applied to process the calibration values of the 8 and 10 mil calibration parameter groups to determine one or more calibration parameter values that may be applied to generate, say a 9 mil spot size. As a result, a data structure 80 having a limited number of calibration parameter groups 80a may be utilized to determine many other calibration parameter groups (or values) useful to calibrate suitable evaluation systems including systems 12 or 12a.

Referring to FIGS. 6B and 6C there are illustrated two additional embodiments of data structures 82 and 84, respectively, which may be applied (directly or indirectly) to calibrate embodiments of evaluation systems of the invention. Data structure 82 depicts a calibration parameter group 82a that may be employed with a system comprised of multiple fixed position (fixed distance) scanners. The terms "fixed position" and "fixed distance" indicates the distance between the scanner unit and the indicia to be scanned is not adjustable. However, the term is not meant to preclude the possibility that the fixed distance scanner units can be laterally repositioned, wherein the distance from the scanner unit an indicia to be scanned is held substantially constant as the lateral position (with respect to the width of the printing medium) is altered to properly scan a particular indicia. In addition, a fixed distance scanner unit may be mounted at a required distance to generate a required spot size, while a second fixed distance scanner unit may be mounted so as to generate (when selected) a spot size different from the spot size generated by the first scanner unit.

Returning to FIG. 6C, the data structure 84 shown provides a calibration parameter group 84a that may be employed with a system comprised of multiple scanners, some of which may be adjustable to generate a selected spot size. As such a "scanner unit ID number" is provided to identify the calibration parameter groups, such as group 84a, which are associated with a particular scanner unit 20a. If the associated scanner unit 20a is a fixed position scanner, the spot size and distance values would not be included with calibration parameter group 84a.

It should be understood that the embodiments of data structures provided by FIGS. 6A through 6C are illustrative only. Skilled individuals will recognize many variations and modifications may be made to these data structures to provide similar structures, including data structures comprised of a mix of the calibration parameter groups 80a, 82a, and/or 84a. It is intended to claim all such variations that fall within the scope of the present invention.

Figure 7A:
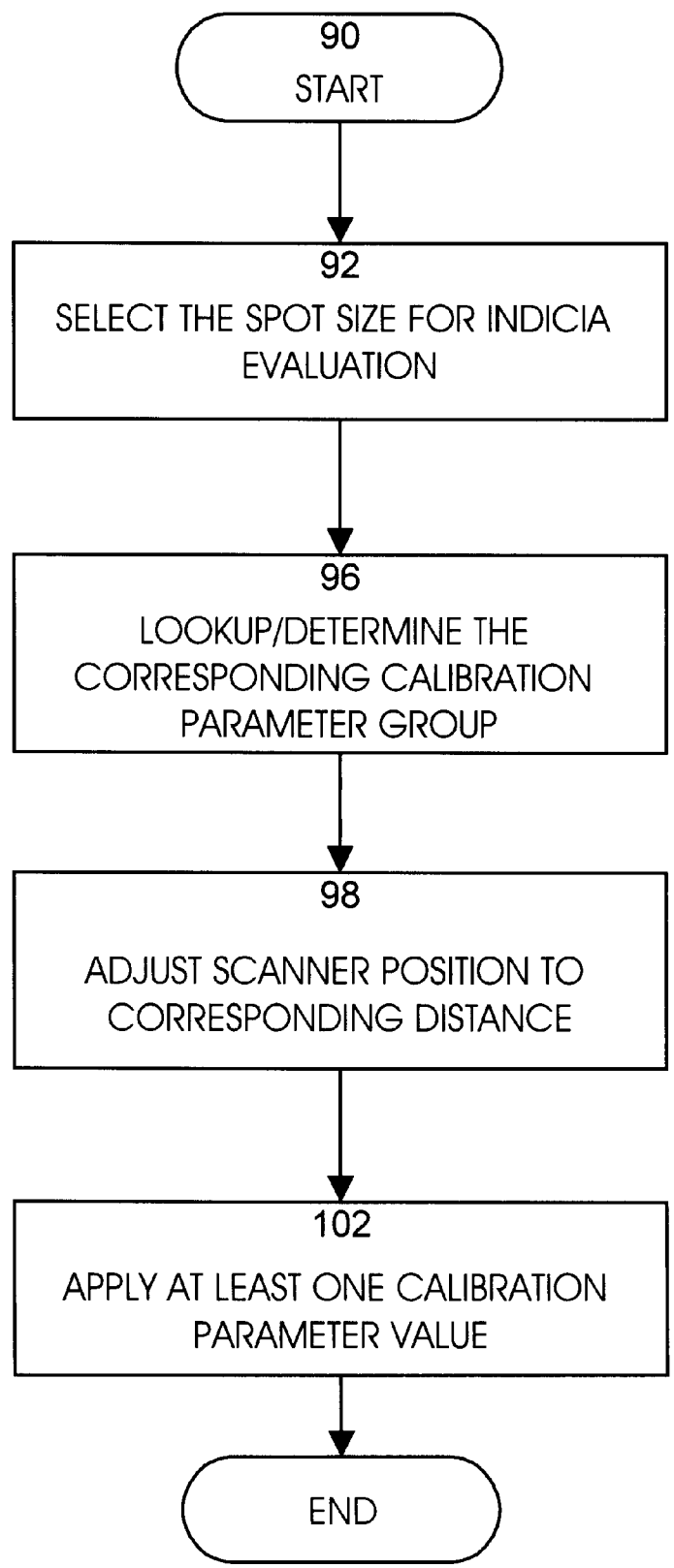
FIG. 7A is a flowchart of a method to configure and calibrate the embodiment of FIGS. 2A and 2B

Methods may be employed to determine the various parameter values of data structures such as 80, 82 and 84, and subsequently to apply such values to configure and calibrate evaluation systems such as 12 and 12*a*. Several embodiments of such methods will now be discussed. Referring to FIG. 7A there is provided a flowchart of a method to calibrate an evaluation system comprised of a position adjustable (i.e. slidably supported) scanner unit. The method begins at 90, with a spot size selected at 92. A "lookup" of the associated calibration parameter group, possibly including a determination by known relationships of additional calibration parameter values, is conducted at 96. Next, at 98 the distance between the scanner unit and the target indicia is adjusted to generate the selected spot size. The distance value required is determined from the associated calibration parameter group. Then at 102 at least one calibration parameter value is applied to calibrate the system for operation at the required distance. Thus, the simple method of FIG. 7A allows a scanning unit to be positioned and an associated evaluation system to be calibrated to evaluate indicia with the selected spot size. It should be understood that the order of 98 and 102 may be interchanged.

Figure 7B:
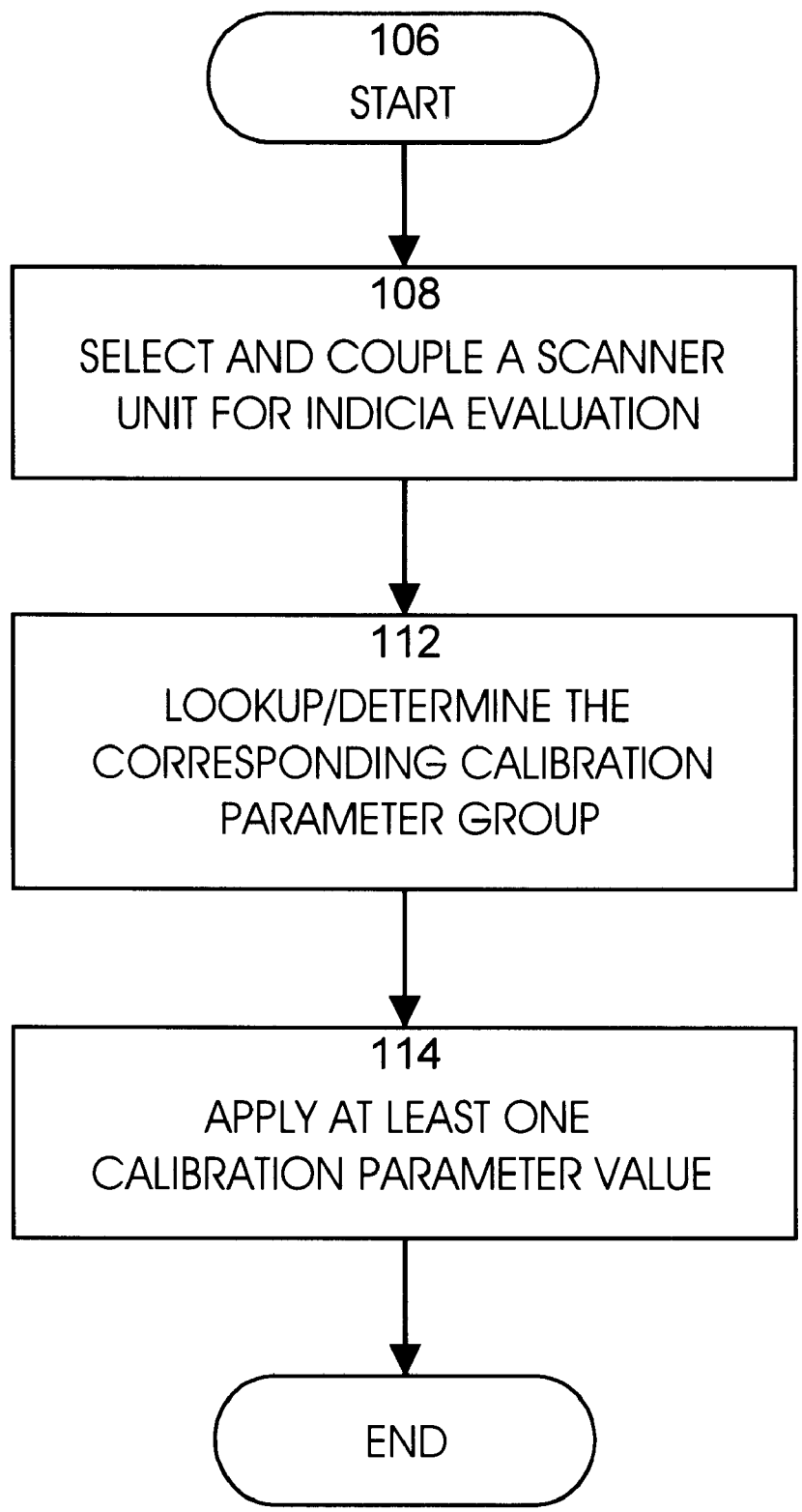
FIG. 7B is a flowchart of a method to configure and calibrate an embodiment of the invention arranged with a plurality of selectable fixed position scanner units.

Referring now to FIG. 7B, a flowchart is provided of a method to calibrate an evaluation system comprised of a plurality of fixed position scanner units. The method begins at 106. At 108 a scanner unit is selected and operatively coupled to a suitable evaluation system such as the evaluation and computing means 30 of FIG. 2B. At 112 a lookup of the associated calibration parameter group and possibly a determination of additional calibration parameter values is carried out. At 114, at least one calibration parameter value is applied to calibrate the evaluation system for use with the selected and coupled scanner unit. The method of FIG. 7B may then be repeated for any additional scanner units that may be selected and coupled to the evaluation system.

Referring now to FIG. 7C, a flowchart is provided for an embodiment of a method to calibrate an evaluation system comprised of a plurality of fixed position and (distance) adjustable scanner units. The method begins at 120. At 122 a scanner unit is selected and operatively coupled to the associated evaluation system. At 124, a determination is made as to whether the scanner unit selected is fixed position or adjustable. Such a determination may be based on an ID code used to identify the selected scanner unit, or other known and suitable approaches. If adjustable, at 126 a spot size is selected to be generated by the scanner unit. The selection of a particular spot size may be provided by an operator via an operator interface, indirectly by the selection of a bar code symbology, or by way of a particular quality standard or guideline to be used as a basis for the subsequent evaluation. Next, at 128 a lookup of the corresponding calibration parameter group, again possibly including a determination of additional calibration parameter values, is conducted. At 134, the selected (position adjustable) scanner unit is positioned at the required distance to generate the selected spot size. Then at 136, at least one calibration parameter value is applied to calibrate the evaluation system for use with the selected and coupled scanner unit.

Returning to 124 of FIG. 7*c*, if the scanner unit selected is a fixed position scanner unit, at 128*a* a lookup and possibly a determination of one or more calibration parameter values is carried out. Next, at 136*a*, at least one calibration parameter value is applied to calibrate the evaluation system for use with the selected and coupled scanner unit. If a plurality of scanner units are to be selected and coupled to the evaluation system, the method of FIG. 7C may be repeated as required to select, couple, and calibrate the evaluation system for use with each of the plurality of available scanner units (as required).

Figure 8:
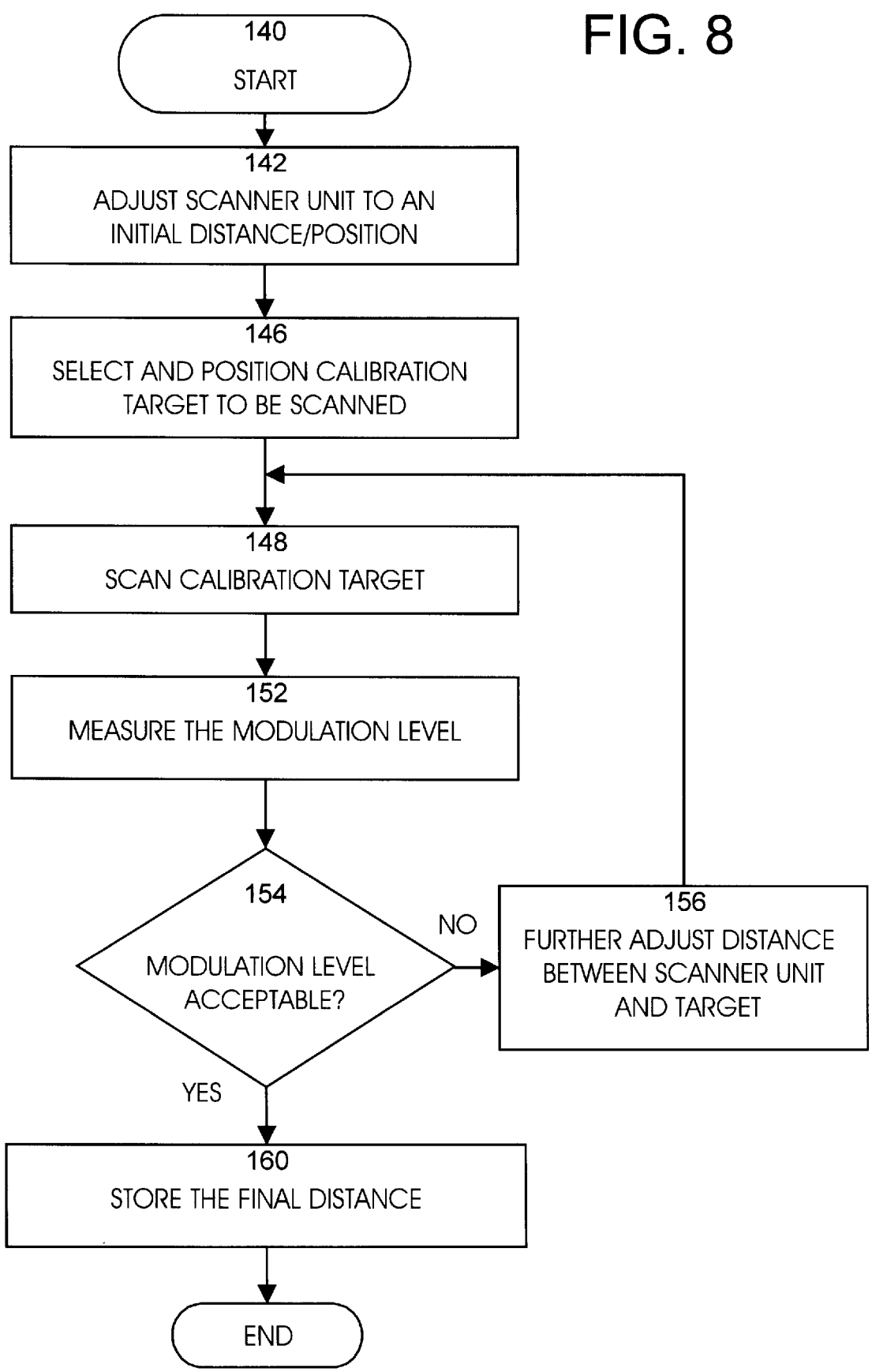
FIGS. 8 and 9 provide flow charts of embodiments of methods useful to determine values comprising one or more calibration parameter groups.
Figure 9:
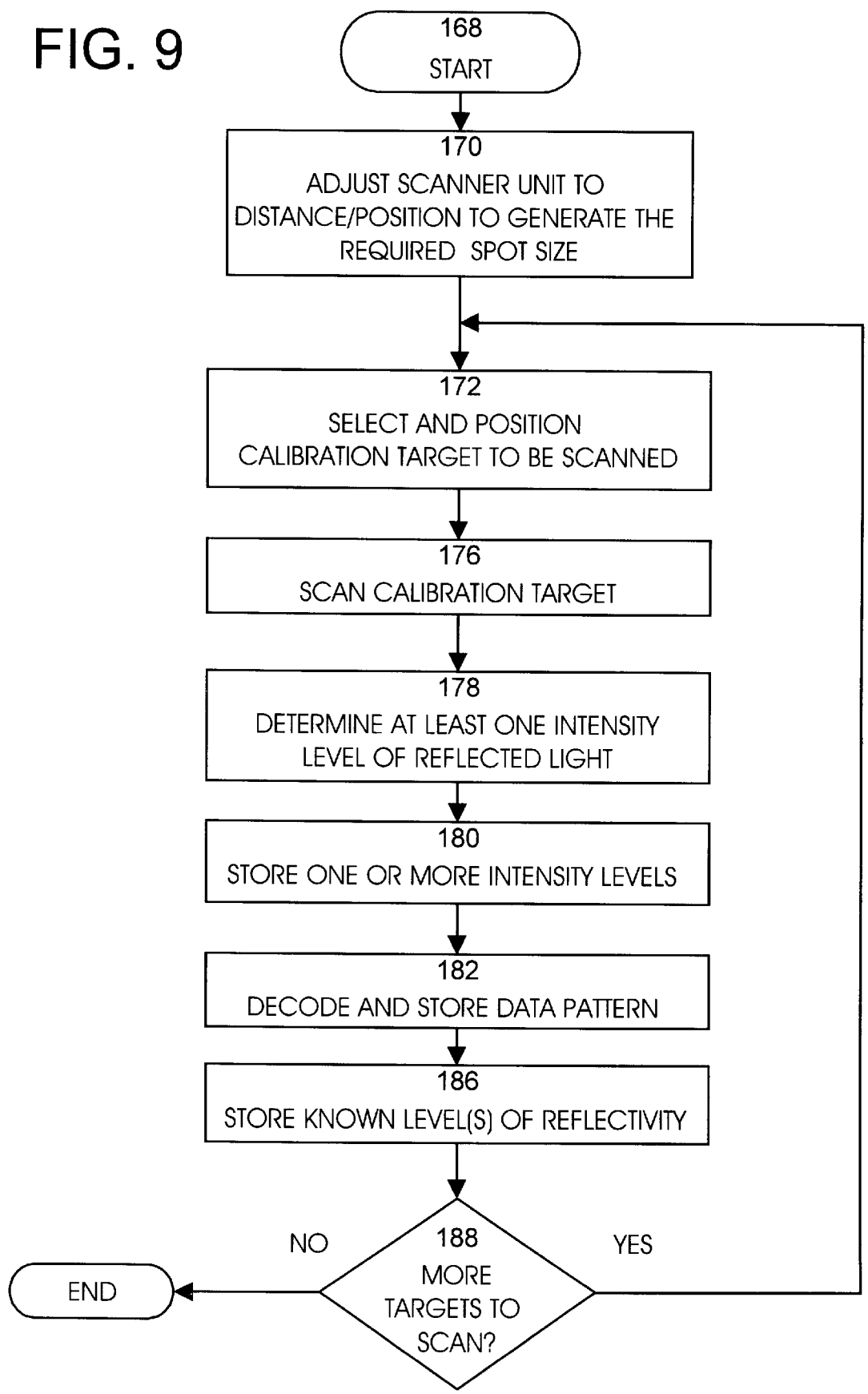

It should be noted that modifications to the embodiments of the methods provided by the flowcharts of FIGS. 7A, 7B, and 7C would be apparent to skilled individuals. For example, as with the embodiment of FIG. 7B, the order of 134 and 136 as shown in FIG. 7C may be reversed. Yet other modifications are also possible. However, it will be appreciated that the concept of selecting, possibly positioning one or more scanner units, and applying one or more available (i.e. looked up or determined) calibration parameter values to calibrate an associated evaluation system is fundamental and germane to the invention disclosed herein. Further, it should be understood that the methods provided by FIGS. 7A, 7B, and 7C are employed to utilize directly or indirectly one or more known (or determinable) calibration parameter values. As such, these methods are not capable of "defining" a plurality of calibration parameter values or groups to establish a data structure, for example the data structure 80 of FIG. 6A. FIGS. 8 and 9 provide example embodiments of methods that may be employed to define required data structures and their respective calibration parameter groups.

Referring now to FIG. 8, there is shown a flowchart of an embodiment of a method to determine a required distance between a scanner unit and an indicia to generate a selected or required spot size. The method uses special calibration targets (not illustrated herein) which produce a predetermined level of "modulation" when scanned with a specific (and predefined) spot size. The special calibration targets, which support this indirect method of determining the spot size generated by a scanner, are available from Applied Image, Inc. One of the known uses for targets of this kind is to verify the accuracy with which an evaluation system measures an indicia's level of modulation. As such, they may be considered 'standards' for modulation measurement equipment. However, by reversing the process and using the known modulation at a predetermined spot size, one may determine the required distance to generate a desired or selected spot size. Therefore, by monitoring the level of modulation, while adjusting the distance between the scanner unit 20*a* and the calibration target, it is possible to accurately determine, say within +/−5%, the distance required to produce the required spot size. FIG. 8 provides a method that may be utilized to determine the required distance to generate a predetermined spot size. The distance is found by iteratively adjusting the distance between the scanner unit and the target indicia being scanned until a predetermined modulation value is detected (e.g., by the evaluation unit). The final distance, which produces the desired modulation and required spot size, may then be stored for later retrieval. The method begins at 140, and at 142 provides for the adjustment of the scanner unit to an initial (starting) distance. At 146 a calibration target having a known modulation value when scanned with the desired spot size is selected and positioned so as to be scannable by the scanner unit. Next, a loop comprised of 148, 152, 154 and 156 is executed iteratively, until the measured level of modulation is within a predefined tolerance limit, thereby indicating that the required distance has been determined with sufficient accuracy. When the measured level of modulation is within the predefined limit (or range), the final distance is stored in a suitable memory unit at 160. The process may then be repeated to determine additional distances to generate additional spot sizes, as required. This may require the use of additional special calibration targets having known modulation levels when scanned with particular spot sizes, or alternately using a single calibration target and seeking appropriate modulation levels for each of several required spot sizes. The accuracy required for the actual spot size generated by the scanner unit may be impacted by not only the predefined tolerance limit, but also by such factors as the accuracy with which the modulation can be determined, the accuracy available to measure the final distance, among other known factors.

Referring now to FIG. 9, there is provided a method to determine and store intensity values and associated reflectivity values of one or more calibration targets, such as targets 70 and 72 of FIG. 5C. This method may be utilized subsequent to the use of the method of FIG. 8 after one or more distances have been determined for the generation of one or more respective spot sizes. The method of FIG. 9 starts at 168. At 170 an adjustment of the scanner unit to the required distance (to generate the associated or desired spot size) maybe made. At 172 a calibration target having at least one known absolute level of reflectivity and a unique known data pattern disposed thereon, is selected and positioned in a position where target indicia would normally be placed. At 176 the calibration target is scanned, and at 178 and 180 the intensity level or levels of reflected light received by the scanner unit are determined and stored, respectively. At 182 the data pattern disposed on the calibration target maybe decoded and stored. Next, at 186 the known absolute level or levels of reflectivity of the calibration target scanned at 176 are stored. The known level or levels of reflectivity may be provided by an operator or may be determined from the decoding of the data pattern of the target. For example, if a plurality of calibration targets are available, each having at least one known absolute level of reflectivity and known (unique) data pattern disposed thereon, a look-up table or data structure may be established to relate the data pattern to the known levels of reflectivity. The data structure may then be accessed, for example by an evaluation and computing means such as 30, to determine from the data pattern the known corresponding levels of reflectivity of the calibration target. Once the selected target has been scanned and the required parameter values determined and stored, additional calibration targets may be scanned, as required. Thus, if at 188 more targets are to be scanned to determine additional parameter values, the loop comprised of 172 through 188 is repeated, and will be executed for each of the additional targets. At the point where all required calibration targets have been scanned, the method is exited at 188.

It will be appreciated that modifications to the embodiments of the methods provided by the flowcharts of FIGS. 8 and 9 would be apparent to skilled individuals. For example, in FIG. 9, the order of 178/180 and 182 may be switched. That is, the data pattern can be decoded and stored, and a subsequent determination and storage of one or more intensity levels may occur. Further, the storage of the data pattern may not be required at all. Yet other modifications are also possible and contemplated as being within the scope of the invention.

A preferred embodiment of FIG. 9 requires the scanning of two calibration targets, one to calibrate the reflectivity of bar elements and a second to calibrate the reflectivity of space elements. As shown in FIG. 5B, if the reflectivity of a bar element $R_B$ and the associated intensity level $I_B$, along with the reflectivity of a space element $R_S$ and the associated intensity level $I_S$ have been determined, a linear relationship defined by line 58 may be employed to provide a calibrated absolute level of reflectivity for any measured intensity level.

While there have been described the currently preferred embodiments of the present invention, those skilled in the art will recognize that other and further modifications may be made without departing from the invention and it is intended to claim all modifications and variations as fall within the scope of the invention and the appended claims.

What is claimed is:

1. An evaluation system to evaluate the quality of a target indicia, the system comprising:

(a) a plurality of scanner units; and (b) a computing and evaluation system structured to enable at least one scanner unit to be selected and operatively coupled to support an accurate evaluation of indicia;

(c) the computing and evaluation system including a memory unit to store, and retrieve as needed, any of a plurality of calibration parameter groups, each calibration parameter group comprised of a plurality of calibration parameter values, wherein at least one of the calibration parameter values is employed to calibrate the evaluation system for use with each selected scanner unit.

2. The evaluation system according to claim 1, further including support means arranged to slideably support at least one scanner unit of the system, the support means provided to enable the distance between the supported scanner unit and the target indicia to be adjusted to a required distance to generate a selected spot size to be employed to evaluate the target indicia.

3. The evaluation system according to claim 2, further including an adjustment module operatively coupled to the computing and evaluation means to enable an accurate adjustment of the distance between the supported scanner unit and the target indicia to a known distance to produce the required spot size.

4. The evaluation system according to claim 3, wherein the computing and evaluation means is arranged to retrieve from the memory unit a calibration parameter value from a respective calibration parameter group associated with a selected scanner unit to produce the selected spot size.

5. The evaluation system according to claim 4, further including an interface unit to enable selected scanner units to be operatively coupled to the computing and evaluation system.

6. The evaluation system according to claim 5, wherein the interface unit is incorporated within the computing and evaluation system.

7. The evaluation system according to claim 4, wherein the system is configured to evaluate target indicia in at least one of the following situations:

(a) as indicia are printed on a printing press, with the plurality of selectable scanner units arranged to enable scanning at a plurality of locations about the printing press; and (b) as indicia previously disposed on a substrate pass a respective selected scanner unit.

8. The evaluation system according to claim 3, further including an operator interface to enable an operator to select the spot size to be generated by at least one of the selected scanner units, the spot size selected utilized to enable the computer controlled adjustment of the distance between the scanner unit and the target indicia to the distance required to generate the selected spot size.

9. A scanning and evaluation apparatus for use in an evaluation of a target indicia, the evaluation conducted using a selected spot size generated by a scanner unit, the scanning and evaluation apparatus comprising:

(a) the scanner unit;

(b) support means arranged to slideably support the scanner unit to enable the distance between the scanner unit and the target indicia to be adjusted to a required distance to generate the selected spot size;

(c) an adjustment module mechanically coupled to the slidably supported scanner unit to enable the accurate and automated adjustment of the distance between the scanner unit and the target indicia; and (d) computing and evaluation means configured to be operatively coupled to the scanner unit and the adjustment module, the computing and evaluation means having a memory unit to store a plurality of calibration parameter groups that are available to be retrieved from the memory unit and applied, at least in part, to calibrate the scanning and evaluation apparatus for evaluation with the selected spot size.

10. The scanning and evaluation apparatus according to claim 9, wherein the adjustment module is responsive to the evaluation and computing means to enable computer controlled adjustment of the distance between the scanner unit and the target indicia.

11. The scanning and evaluation apparatus according to claim 10, wherein the computing and evaluation means further includes an operator interface to enable an operator to select the spot size to be generated by the scanner unit.

12. The scanning and evaluation apparatus according to claim 11, wherein the computing and evaluation means is provided by a general purpose computing system having at least one plug-in board installed therein to provided at least one of:

(a) the required evaluation and computing functions employed to process data received from the scanner unit; and (b) interface functions to operatively couple the scanner unit.

13. The scanning and evaluation apparatus according to claim 9, wherein each retrievable calibration parameter group is comprised of a plurality of calibration parameter values, at least one calibration parameter value utilized by the computing and evaluation means through at least one of the following actions:

a) applying the calibration parameter value to calibrate scanning and evaluation apparatus; and b) determining at least one additional calibration parameter value, using known relationships and at least one calibration parameter value retrieved from the memory unit, and applying each determined calibration parameter value to calibrate the scanning and evaluation apparatus.

14. The scanning and evaluation apparatus according to claim 13, wherein a plurality of the calibration parameter groups each include a predetermined distance value that is employable to establish the distance required between the scanner unit and the target indicia to generate the selected spot size.

15. The scanning and evaluation apparatus according to claim 13, wherein each calibration parameter group further includes at least one of a reflectivity value and at least one of an intensity value.

16. The scanning and evaluation apparatus according to claim 15, further including at least one calibration target having at least one known absolute level of reflectivity.

17. In a distributed evaluation arrangement of the type employable for evaluating target indicia, the distributed evaluation arrangement including a plurality of evaluation systems connected via at least one communication link to a master computer to enable the exchange of information including calibration parameter groups stored on the master computer and downloadable to at least one of the plurality of evaluation systems, each evaluation system including:

(a) at least one scanner unit, which may be one of fixed mounted or slidably mounted, wherein each slidably mounted scanner unit is included to enable the distance between the scanner unit and the target indicia to be adjusted to a required distance to generate a selected spot size; and (b) a computing and evaluation system operatively coupled to at least one included scanner unit to enable indicia evaluation;

(c) the computing and evaluation system including a memory unit to store at least one calibration parameter group that may be downloaded from the master computer, and is employable to calibrate the respective evaluation system.

18. The distributed evaluation arrangement according to claim 17, wherein at least one evaluation system having a slidably mounted scanner unit further includes an adjustment module operatively coupled to the computing and evaluation system, and suitably fixed to the scanner unit, to enable the automatic and computer controlled adjustment of the distance between the slidably mounted scanner unit and the target indicia to a known distance to produce a required spot size to be employed for evaluation.

* * * * *